United States Patent
Kasahara

(10) Patent No.: US 9,724,950 B2
(45) Date of Patent: Aug. 8, 2017

(54) PRINTING APPARATUS AND PRINTING CONTROL METHOD

(71) Applicant: Seiko Epson Corporation, Tokyo (JP)

(72) Inventor: Hideaki Kasahara, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/267,481

(22) Filed: Sep. 16, 2016

(65) Prior Publication Data
US 2017/0080732 A1 Mar. 23, 2017

(30) Foreign Application Priority Data

Sep. 18, 2015 (JP) ................................ 2015-185963

(51) Int. Cl.
*B41J 29/393* (2006.01)
*B41J 2/045* (2006.01)

(52) U.S. Cl.
CPC ........... *B41J 29/393* (2013.01); *B41J 2/0456* (2013.01); *B41J 2/04558* (2013.01)

(58) Field of Classification Search
CPC ..... B41J 2/0456; B41J 2/04558; B41J 29/393
See application file for complete search history.

(56) References Cited

U.S. PATENT DOCUMENTS

| 2009/0231376 A1* | 9/2009 | Moriya | B41J 29/393 347/14 |
| 2012/0086987 A1* | 4/2012 | Tamura | G03G 15/011 358/3.24 |
| 2012/0194871 A1 | 8/2012 | Murata | |

FOREIGN PATENT DOCUMENTS

| JP | 2001-219551 A | 8/2001 |
| JP | 2012-158059 A | 8/2012 |

* cited by examiner

*Primary Examiner* — Julian Huffman
(74) *Attorney, Agent, or Firm* — Harness, Dickey & Pierce, P.L.C.

(57) ABSTRACT

There is provided a printer including an imaging device that captures an image of a medium, and a control unit that controls an ink discharge amount of a printing unit that discharges ink to form an image. The control unit acquires a captured image of a test pattern which is obtained by an imaging device and is printed by the printing unit, and controls an ink discharge amount on the basis of a grayscale value of a first region including an outer peripheral edge of the test pattern and a grayscale value of a second region within the test pattern.

9 Claims, 8 Drawing Sheets

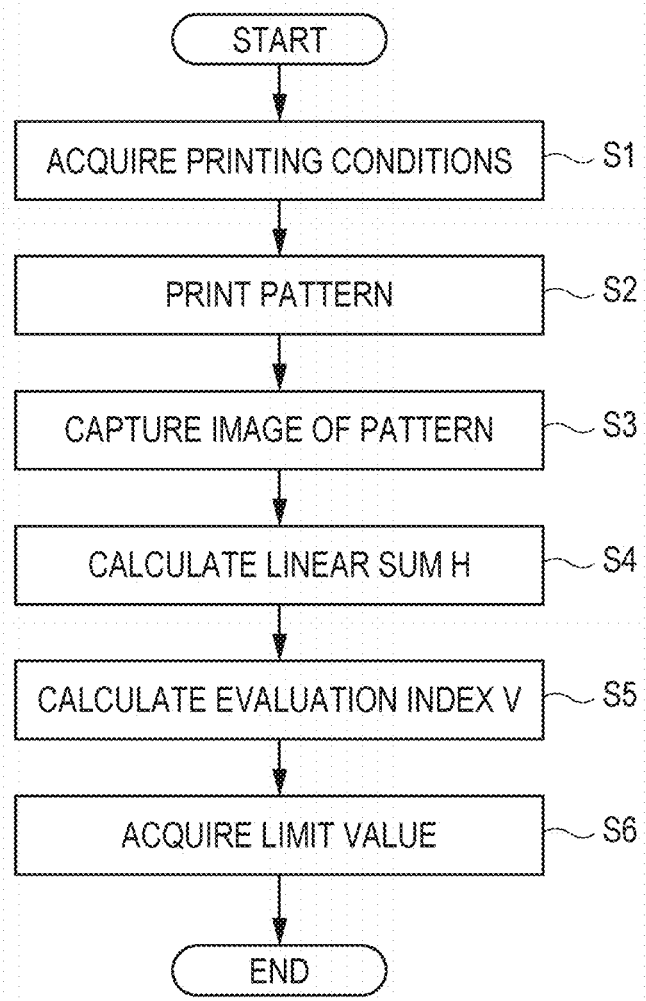

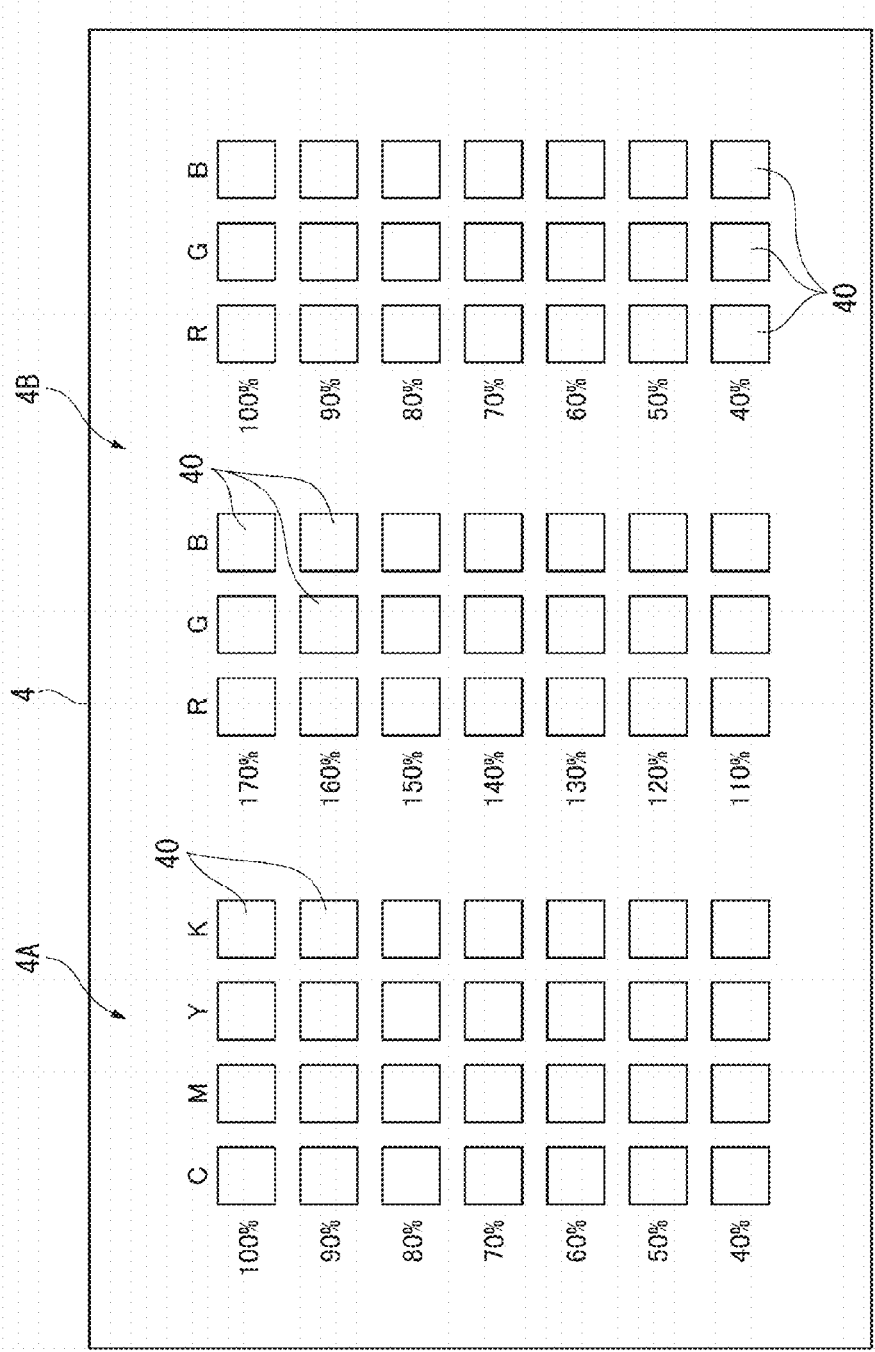

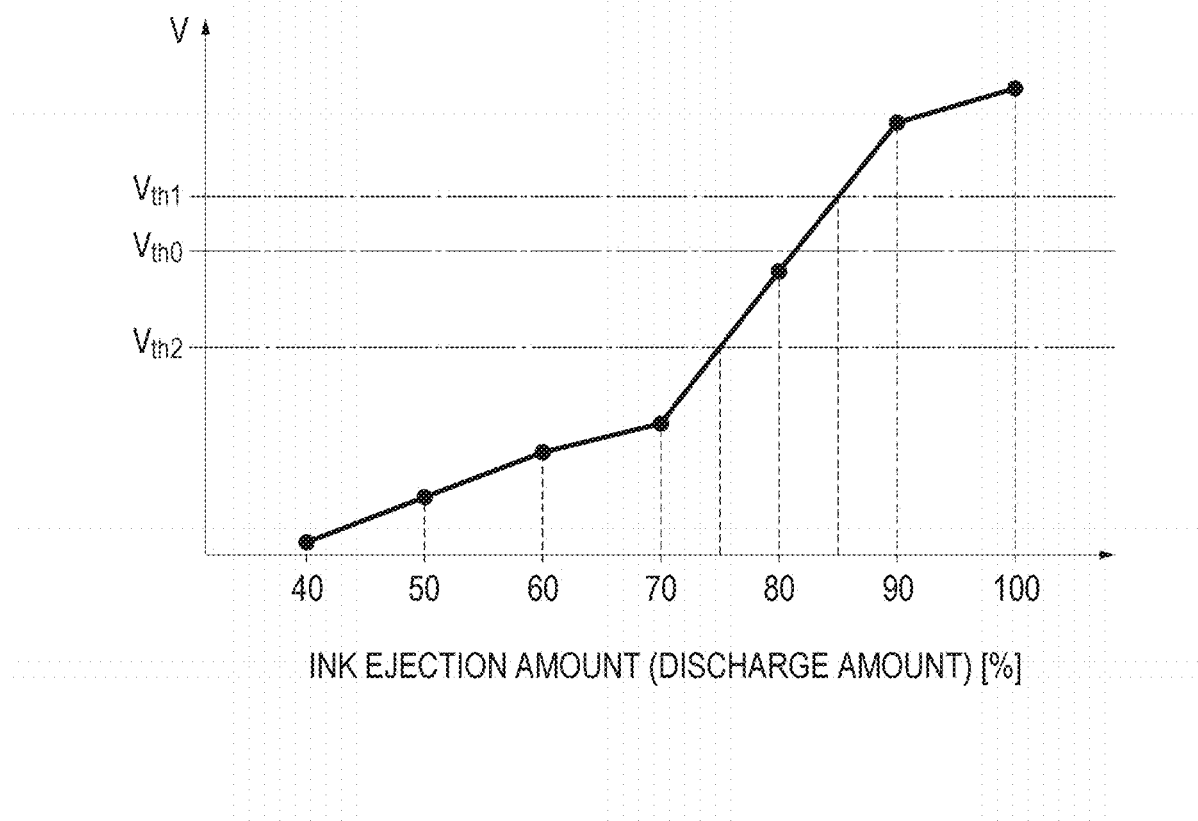

PRINTING APPARATUS AND PRINTING CONTROL METHOD

BACKGROUND

1. Technical Field

The present invention relates to a printing apparatus, a printing control method, and the like.

2. Related Art

In printing apparatuses that discharge ink to form an image, bleeding, unevenness, strike-through, or the like occurs depending on an ink discharge amount (ejection amount) with respect to a medium such as paper, which may degrade printing quality. In addition, when an ink discharge amount is excessively limited, an image with vivid colors and high density cannot be printed, and a reproduction range of colors capable of being expressed by the printing apparatus is narrowed, thereby allowing a high-quality image not to be printed.

Hitherto, there has been known a printing apparatus that sets a limit value of an ink discharge amount in order to expand a color reproduction range as wide as possible so as not to cause such a degradation of printing quality (see, for example, JP-A-2012-158059).

In the printing apparatus disclosed in JPA-2012-158059, a limit value is set in advance in a color variable table in which color data of image data is converted into an ink ejection amount, and an ink discharge amount is controlled so as not to exceed the limit value.

Incidentally, in the printing apparatus disclosed in JP-A-2012-158059 mentioned above, since a limit value described in advance in a color variable table is used, it is possible to cope with only media and operation conditions which are set in advance. For example, since an appropriate limit value cannot be set with respect to a medium which is not recorded in the color variable table, there is a problem in that a high-quality image cannot be formed.

SUMMARY

An advantage of some aspects of the invention is to provide a printing apparatus capable of forming a high-quality image on any medium, and a printing control method.

According to an application example of the invention, there is provided a printing apparatus including an imaging device that captures an image of an object, and a control unit that controls a discharge amount of droplets of a printing unit that discharges the droplets to form an image, wherein the control unit acquires a captured image of a test pattern formed by the printing unit from the imaging device and controls the discharge amount of the droplets on the basis of a grayscale value of a first region including an outer peripheral edge of the test pattern in the captured image and a grayscale value of a second region within the test pattern.

In this application example, the control unit controls a discharge amount of droplets discharged in the printing unit, on the basis of the grayscale value of the first region including the outer peripheral edge of the test pattern in the captured image obtained by the imaging device and the grayscale value of the second region within the test pattern.

When droplets (ink or the like) are discharged from the printing unit to form (print) a test pattern, an excessive discharge amount causes a phenomenon in which the density of the outer peripheral edge of the test pattern becomes higher than that of the inside (for example, the central region) of the test pattern. In this application example, focusing on the phenomenon, it is detected whether there is a difference in density between the first region and the second region, and a discharge amount of droplets in the printing unit is controlled. For this reason, for example, it is possible to appropriately control a discharge amount of droplets with respect to an unknown object (medium) so as to prevent image deterioration due to bleeding or the like, on the basis of a captured image of a test pattern. That is, in the printing apparatus of this application example, it is possible to form a high-quality image on any medium.

In the printing apparatus according to this application example, it is preferable that the control unit set a limit value of the discharge amount of the droplets.

In this application example, a limit value of a discharge amount is set, and thus a discharge amount of the printing unit may be controlled so as not to exceed the limit value, and the control of the printing unit is facilitated. In addition, when a control value is calculated with respect to printing conditions such as a medium and is stored in a storage unit such as a memory, it is possible to easily control a discharge amount of droplets by reading out the control value stored in the storage unit at the time of performing the next printing under the same printing conditions.

In the printing apparatus according to this application example, it is preferable that the control unit calculate an evaluation index for evaluating a difference in density between the first region and the second region on the basis of grayscale values of pixels in the first region and grayscale values of pixels in the second region, to thereby set the limit value on the basis of the evaluation index.

In this application example, an evaluation index is calculated on the basis of a grayscale value of the first region in the captured image and a grayscale value of the second region, and a limit value based on the evaluation index is set. The evaluation index is an index indicating a difference in density between the first region and the second region which is calculated on the basis of the grayscale values, and serves as a standard at the time of setting a limit value of a discharge amount of droplets. That is, the limit value is set on the basis of such a standard, and thus it is possible to accurately obtain a limit value of a droplet discharge amount allowing high-quality printing to be performed, regardless of the type of medium and operation conditions.

In the printing apparatus according to this application example, it is preferable that the imaging device capture an image of light through a plurality of color filters by an imaging element to thereby acquire grayscale values of a plurality of respective colors included in the plurality of color filters, the control unit sets a color variable indicating one color among the plurality of colors to be i to calculate an optical density $A_i$ of each pixel with respect to the color variable i on the basis of the grayscale values of the pixels of the first region and the second region with respect to the color variable i, and sets a coefficient with respect to the color variable i to be $a_i$ to calculate a linear sum H of each pixel by Expression (1) mentioned below, and the evaluation index V is calculated as $V = maxH_1 - avrH_2$ when a maximum value in the linear sum of each pixel with respect to the first region is set to be $maxH_1$, and an average value in the linear sum of each pixel with respect to the second region is set to be $avrH_2$.

$$H = \sum_i a_i A_i \tag{1}$$

In this application example, an evaluation index $V=maxH_1-avrH_2$ is calculated on the basis of the maximum linear sum $maxH_1$ calculated with respect to the first region and the average linear sum $avrH_2$ calculated with respect to the second region.

In this case, a difference between a maximum value of a linear sum with respect to the first region and an average of a linear sum with respect to each pixel of the second region is set to be an evaluation index, and thus it is possible to easily determine whether density in the vicinity of the peripheral portion of a test pattern is higher than that in the central region thereof.

In the printing apparatus of this application example, it is preferable that the imaging device capture an image of light through a plurality of color filters by an imaging element to thereby acquire grayscale values of a plurality of respective colors included in the plurality of color filters, the control unit sets a color variable indicating one color among the plurality of colors to be i to calculate an optical density $A_i$ of each pixel with respect to the color variable i on the basis of the grayscale values of the pixels of the first region and the second region with respect to the color variable i, and sets a coefficient with respect to the color variable i to be $a_i$ to calculate a linear sum H of each pixel by Expression (1) mentioned below, and the evaluation index V is calculated as $V=(maxH_1-avrH_2)/\sigma$ when a maximum value in the linear sum H of each pixel with respect to the first region is set to be $maxH_1$, an average value in the linear sum H of each pixel with respect to the second region is set to be $avrH_2$, and a standard deviation of the linear sum H of each pixel in the second region is set to be $\sigma$.

In this application example, a difference between a maximum linear sum $maxH_1$ calculated with respect to the first region and an average linear sum $avrH_2$ calculated with respect to the second region is further divided by a standard deviation of a linear sum in the second region. In this case, similarly to the above-described application example, it is possible to easily determine whether the density of the edge region of a test pattern is higher than that of the central region thereof, to reduce noise and the influence of a density fluctuation of the central region (second region), and to calculate a limit value with a higher level of accuracy. Here, "the influence of a density fluctuation of the central region" occurs, for example, due to an increase in a fluctuation in a microscopic density (optical density $A_i$) because dots cannot cover the entirety of the inside of a test pattern formation region in a case where a test pattern having a low density (dot occupancy rate) is formed.

In the printing apparatus of this application example, it is preferable that the control unit set the limit value so that the evaluation index is set to be equal to or less than a threshold value.

In this application example, the limit value is set so that the evaluation index calculated as described above is set to be equal to or less than a predetermined threshold value. The evaluation index exceeding the threshold value means that droplets are not discharged with an appropriate discharging amount due to a difference in density between the outer peripheral edge and the central region of a test pattern. On the other hand, in this application example, a limit value set to be equal to or less than the threshold value is set, and thus it is possible to suppress deterioration in image quality due to bleeding or the like and to expand a color reproduction range as wide as possible.

In the printing apparatus of this application example, it is preferable that when the control unit receives a threshold value change request for changing the threshold value, the control unit change the threshold value on the basis of the threshold value change request.

In this application example, it is possible to change the threshold value on the basis of the threshold value change request. In this case, it is possible to appropriately make a change to an optimal limit value in accordance with a user's preference or operation conditions of an object to be used and the like.

It is preferable that the printing apparatus of this application example further include a movement mechanism that moves the imaging device relatively to the object in one direction.

In this application example, the imaging device can be moved relatively to the object. In other words, an imaging region of which the image is capable of being captured by the imaging device can be moved with respect to the object along one direction. In this case, for example, the imaging device is moved relatively to a test pattern printed by the printing unit, and thus the imaging region moves into the test pattern from the outside thereof, thereby allowing captured images of the first region in which the outer peripheral edge of the test pattern is included in the imaging region and the second region in which the imaging region is included within the test pattern to be easily acquired.

In the printing apparatus of this application example, it is preferable that the control unit calculate a pixel average value obtained by averaging the grayscale values of pixels in a direction intersecting the one direction in the captured image, to thereby control a discharge amount of the droplets on the basis of the pixel average value along the one direction.

In this application example, as described above, the imaging device is moved relatively to the object along one direction, and the imaging region is moved into the test pattern from the outside thereof, thereby acquiring captured images with respect to the first region and the second region. Here, in a case where a test pattern includes a side intersecting one direction, a large discharge amount of droplets during the formation of the test pattern makes a high-density region appear along the side, and the density becomes lower toward the inside from the side and is set to a substantially constant value. Accordingly, in the captured images, pixels having similar grayscale values are arranged in a direction perpendicular to one direction, and the grayscale values in the direction are averaged to be set as a pixel average value, thereby allowing changes in the above-mentioned grayscale values along the one direction to be detected. In this case, it is possible to achieve simplification of processing and to reduce a time by the control of a discharge amount of droplets, for example, as compared to a case where a linear sum is calculated with respect to all pixels.

It is preferable that the printing apparatus of this application example further include a carriage that has the imaging device and the printing unit mounted thereon, wherein the movement mechanism moves the carriage relatively to the object along the one direction.

In this application example, the imaging device and the printing unit are mounted on the carriage. In this case, for example, it is possible to achieve the simplification of a configuration, as compared to a case where the imaging device and the printing unit are separately provided, and movement mechanisms corresponding to the imaging device and the printing unit are provided. In addition, an image of a test pattern printed by the printing unit is captured by the imaging device mounted on the same carriage, and thus it is possible to more rapidly control a discharge amount.

According to another aspect of the invention, there is provided a printing control method including acquiring a captured image of a test pattern formed by discharging droplets by a printing unit, and controlling a discharge amount of the droplets in the printing unit on the basis of a grayscale value of a first region including an outer peripheral edge of the test pattern in the captured image and a grayscale value of a second region within the test pattern.

In this embodiment, similarly to the above-described application example, it is detected whether there is a difference in density between the first region and the second region, and a discharge amount of droplets in the printing unit is controlled. For this reason, for example, it is possible to appropriately control a discharge amount of droplets with respect to an unknown medium so that the above-mentioned high-quality image can be formed on the basis of the captured image of the test pattern, and to form a high-quality image on any medium.

BRIEF DESCRIPTION OF THE DRAWINGS

The invention will be described with reference to the accompanying drawings, wherein like numbers reference like elements.

FIG. 5 is a flow chart showing a limit value acquisition process in a printing control method of this embodiment.

FIG. 6 is a diagram showing an example of a test chart of this embodiment.

FIG. 8 is a diagram showing a relationship between an ink discharge amount (ejection amount) and an evaluation index.

DESCRIPTION OF EXEMPLARY EMBODIMENTS

Hereinafter, an embodiment according to the invention will be described with reference to the accompanying drawings.

Schematic Configuration of Printer

Figure 1:
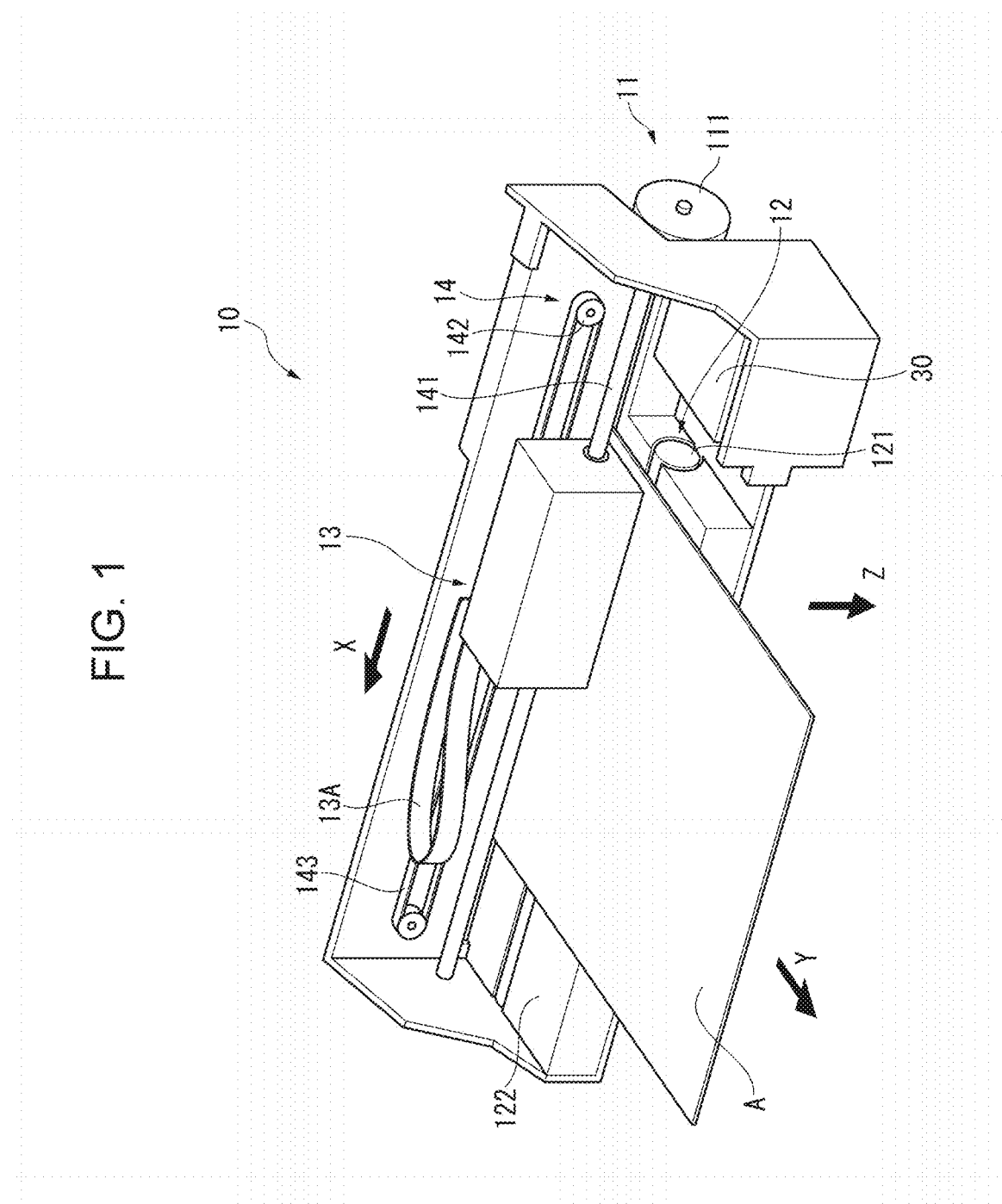
FIG. 1 is a perspective view showing a schematic configuration of a printer which is a printing apparatus of an embodiment according to the invention.

FIG. 1 is a perspective view showing a schematic configuration of a printer 10 which is a printing apparatus of this embodiment.

Figure 2:
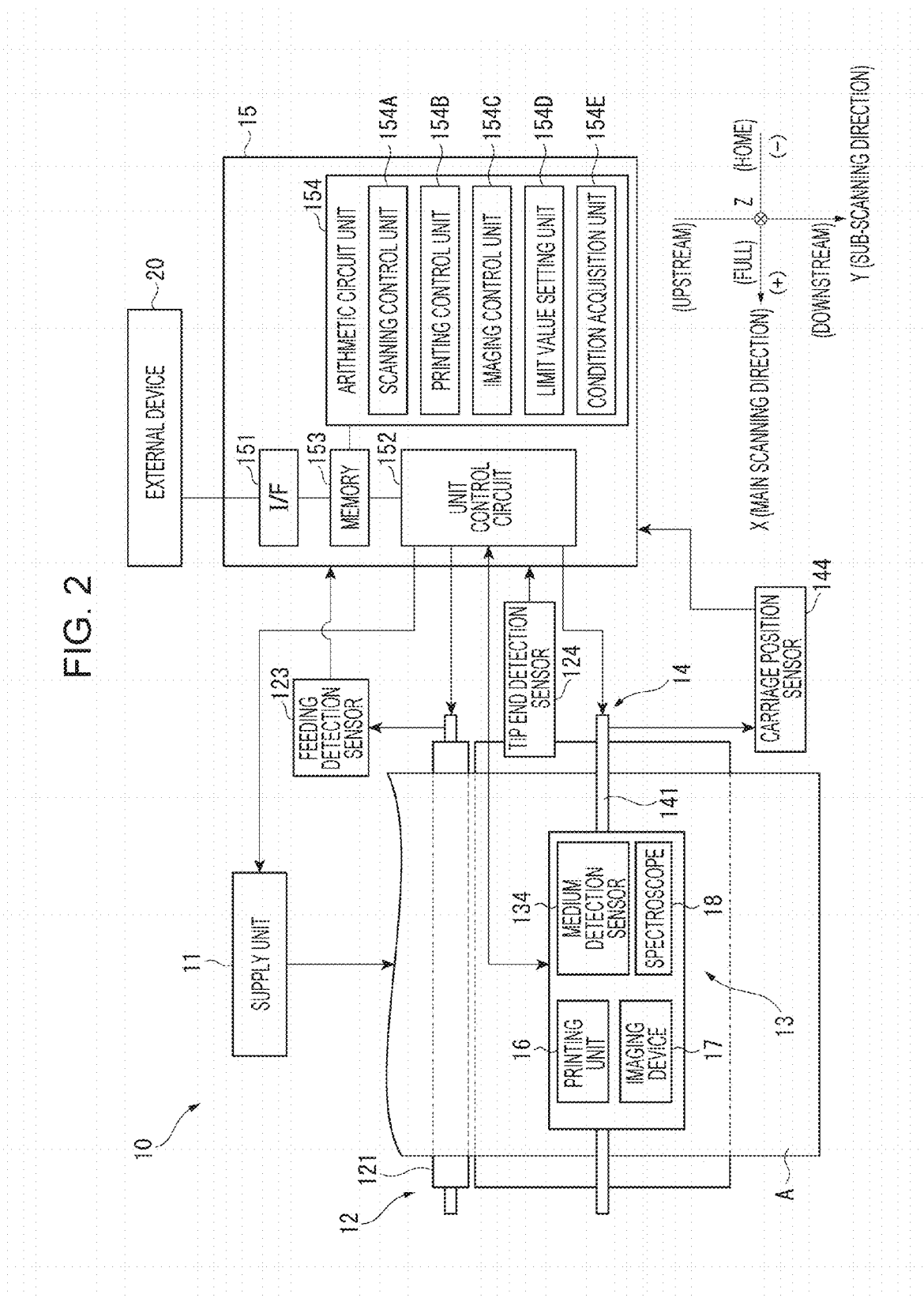
FIG. 2 is a block diagram showing a schematic configuration of the printer of this embodiment.

FIG. 2 is a block diagram showing a schematic configuration of the printer 10 of this embodiment.

As shown in FIG. 1, the printer 10 includes a supply unit 11, a transport unit 12, a carriage 13, a carriage movement unit 14, and a control unit 15 (see FIG. 2). The printer 10 controls the units 11, 12, and 14 and the carriage 13 on the basis of printing data which is input from an external device 20 such as a personal computer, and prints an image on a medium A (object of the invention). In addition, the printer 10 of this embodiment forms a test pattern 40 (see FIGS. 6 and 7) at a predetermined position on the medium A on the basis of image data for test pattern for determining an ink discharge amount which is set in advance. An imaging device 17 provided in the carriage 13 captures an image of the test pattern 40, and the printer 10 controls a discharge amount (ejection amount) of ink (droplets of the invention) on the basis of the captured image. In other words, the printer 10 calculates an evaluation index for setting a limit value of an ink discharge amount from the outer peripheral edge and the central portion of the test pattern 40 and grayscale values. The printer 10 sets a limit value of an ink discharge amount on the basis of the calculated evaluation index, and makes the printing unit 16 discharge ink so as not to exceed the limit value, thereby suppressing the degradation of printing quality due to bleeding, unevenness, or strike-through which is caused by an excessive ink discharge amount.

Hereinafter, components of the printer 10 will be specifically described.

The supply unit 11 is a unit that supplies a medium A (paper in this embodiment), which is an object on which an image is formed, to an image formation position. The supply unit 11 includes a roll body 111 (see FIG. 1) on which, for example, the medium A is wound, a roll driving motor (not shown), a roll driving train wheel (not shown), and the like. The roll driving motor is rotated on the basis of an instruction signal received from the control unit 15, and a rotation force of the roll driving motor is transmitted to the roll body 111 through the roll driving train wheel. Thereby, the roll body 111 is rotated, and paper wound around the roll body 111 is supplied to a downstream side (+Y side) in a Y-direction (sub-scanning direction).

Meanwhile, in this embodiment, an example in which paper wound around the roll body 111 is supplied is described, but the invention is not limited thereto. For example, the medium A may be supplied by any supply method such as the supply of each of the media A, such as sheets of paper loaded in a tray or the like, using a roller or the like.

The transport unit 12 transports the medium A supplied from the supply unit 11 along the Y-direction. The transport unit 12 is configured to include a transport roller 121, a driven roller (not shown) which is disposed across the medium A from the transport roller 121 and follows the transport roller 121, and a platen 122.

When a driving force from a transport motor not shown in the drawing is transmitted and the transport motor is driven under the control of the control unit 15, the transport roller 121 is rotated by the rotation force and transports the medium A along the Y-direction in a state where the medium A is interposed between the transport roller and the driven roller. In addition, the platen 122 facing the carriage 13 is provided on the downstream side (+Y side) of the transport roller 121 in the Y-direction, and supports the medium A. A printing process, an imaging process, a spectrometry process, and the like are performed on the medium A within a region in which the medium A is supported by the platen 122.

In addition, the transport unit 12 is provided with various sensors such as a feed detection sensor 123 (see FIG. 2) and a tip end detection sensor 124 (see FIG. 2). The feed detection sensor 123 is a sensor that detects the amount of transport of the medium A, and examples of thereof may include a rotary encoder that detects the amount of rotation of the transport roller 121, and the like. The tip end detection sensor 124 is a sensor that detects a tip end position of the medium A transmitted to the platen 122, and examples thereof may include a switching sensor that senses abutting of the tip end of the medium A transported, and the like.

Detection signals transmitted from the sensors 123 and 124 are appropriately output to the control unit 15.

As shown in FIG. 2, the printing unit 16 that printing an image on the medium A, the imaging device 17 that captures an image on the medium A, and a spectroscope that performs spectrometry at a predetermined color measurement position on the medium A are mounted on the carriage 13.

The carriage 13 is provided so as to be movable along an X-direction (main scanning direction; one direction in the invention) which intersects the Y-direction by the carriage movement unit 14. Meanwhile, in the following description, an −X side in the main scanning direction (X-direction) may be referred to as a Home side, and an +X side may be referred to as a Full side. Here, the Home refers to a position where the carriage 13 is retreated in a stand-by state where a printing process is not performed. In addition, the Full refers to a side opposite to the Home.

In addition, the carriage 13 is connected to the control unit 15 by a flexible circuit 13A, and performs a printing process (image forming process on the medium A) of the printing unit 16, an imaging process of the imaging device 17, and a light quantity measurement process of the spectroscope 18 on the basis of an instruction signal received from the control unit 15.

Meanwhile, a detailed configuration of the carriage 13 will be described later.

The carriage movement unit 14 constitutes a movement mechanism in the invention, and reciprocates the carriage 13 along the X-direction on the basis of an instruction signal received from the control unit 15.

The carriage movement unit 14 is configured to include, for example, a carriage guide axis 141, a carriage motor 142 (also referred to as a CR motor), and a timing belt 143.

The carriage guide axis 141 is disposed along the X-direction, and both ends thereof are fixed to, for example, the housing of the printer 10. The carriage motor 142 drives the timing belt 143. The timing belt 143 is supported substantially in parallel with the carriage guide axis 141, and a portion of the carriage 13 is fixed. When the carriage motor 142 is driven on the basis of an instruction signal received from the control unit 15, the timing belt 143 is traveled in forward and reverse directions, and the carriage 13 fixed to the timing belt 143 is guided to the carriage guide axis 141 to reciprocate.

In addition, the carriage movement unit 14 is provided with a carriage position sensor 144. The carriage position sensor 144 is a sensor that detects the position of the carriage 13, and examples thereof may include a linear encoder that detects the amount of movement of the carriage in the X-direction, and the like. A detection signal received from the carriage position sensor 144 is appropriately input to the control unit 15.

Configuration of Carriage

Figure 3:
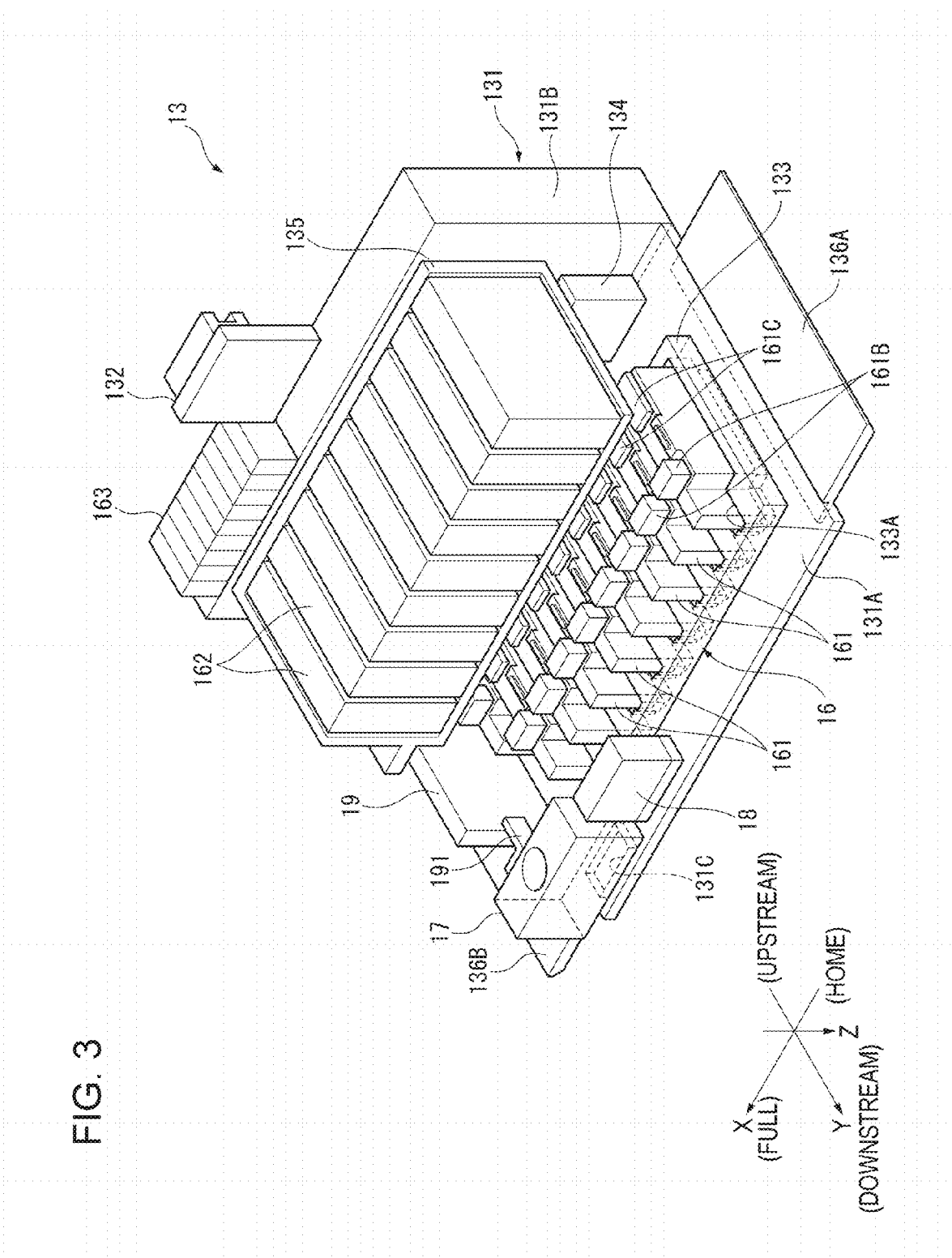
FIG. 3 is a perspective view showing a portion of a carriage of this embodiment.

Next, a configuration of the carriage 13 will be described. FIG. 3 is a perspective view showing a portion of the carriage 13.

The carriage 13 includes a base 131, a connection portion 132 fixed to the base 131, a unit mounting portion 133, a control substrate storage portion 135, and skid plates 136A and 136B, as shown in FIG. 3. A medium detection sensor 134, the printing unit 16, the imaging device 17, the spectroscope 18, and a main circuit board 19 are mounted on the carriage 13.

The base 131 includes a bottom face 131A and a back face 131B as shown in FIG. 3. The unit mounting portion 133 for detachably mounting a plurality of nozzle units 161 of the printing unit 16 is fixed to the bottom face 131A. In addition, the imaging device 17 and the spectroscope 18 are mounted on the bottom face 131A. Meanwhile, the imaging device 17 and the spectroscope 18 may be detachably mounted on the base 131.

Furthermore, openings (only openings 133A and 131C corresponding to the nozzle units 161 and the imaging device 17 are shown in the drawing) which correspond to the medium detection sensor 134, the nozzle units 161 of the printing unit 16, the imaging device 17, and the spectroscope 18 are provided in the bottom face 131A.

In addition, the bottom face 131A includes the skid plate 136A extending from an end on the −X side to the −X side, and the skid plate 136B extending from an end on the +X side to the +X side. The skid plates 136A and 136B have a plate shape parallel to an XY plane, and prevent clogging of the medium A at the time of moving the carriage 13 in the X-direction.

The medium detection sensor 134 is provided on the Home side of the back face 131B and at a position (+Z side) abutting on the bottom face 131A. The medium detection sensor 134 faces the platen 122 from the opening corresponding to the medium detection sensor 134 provided on the bottom face 131A, and detects the transport of the medium A to the platen 122. Examples of a specific configuration of the medium detection sensor 134 may include an optical sensor that includes a light emitting unit and a light receiving unit, is irradiated with light from the light emitting unit, and detects the presence or absence of a medium A by the light receiving unit receiving light reflected by the medium A, and the like.

In addition, the control substrate storage portion 135 is provided on the back face 131B. A plurality of driver substrates 162 corresponding to the respective nozzle units 161 of the printing unit 16 are stored in the control substrate storage portion 135. The driver substrates 162 are disposed such that the substrate surface directions thereof are parallel to a YZ plane, and are provided side by side along the X-direction.

Furthermore, the cartridge filter 163 is detachably provided at an end position on the −Z side on the Full side of the back face 131B. The cartridge filter 163 constitutes a portion of the printing unit 16 and removes foreign substances contained in ink which is supplied to the nozzle units 161 of the printing unit 16, and the like. A supply pipe (not shown) is connected to the cartridge filter 163 and is connected to a supply port 161B of the nozzle unit 161.

Meanwhile, in this embodiment, an ink cartridge (not shown) is provided at a position different from the carriage 13 inside the printer 10, and ink is supplied to the carriage 13 from the ink cartridge to the carriage 13 through, for example, a pipe member such as a tube.

In addition, the connection portion 132 is fixed to a portion (an end on the −Z side as shown in FIG. 3 in this embodiment) of the back face 131B. The connection portion 132 is connected to the carriage movement unit 14.

Configuration of Printing Unit 16

The printing unit 16 individually discharges ink to a portion facing the medium A on the medium A to form an image on the medium A.

The printing unit 16 includes the nozzle units 161, the driver substrates 162, and the cartridge filter 163.

The nozzle units 161 are provided corresponding to respective colors (for example, cyan, magenta, yellow, black, and the like) to be discharged to the medium A.

The nozzle units 161 are provided in openings 133A provided in the unit mounting portion 133 and the bottom face 131A of the base 131, and bottom faces of the nozzle units 161 face a surface of the bottom face 131A which faces the platen 122.

The nozzle units 161 are respectively provided with a plurality of nozzles (not shown), and each of the nozzles is provided with an ink discharge mechanism (not shown). Examples of a configuration of the ink discharge mechanism may include a configuration in which an ink chamber and a piezoelectric element are included, the ink chamber expands and contracts by the driving of the piezoelectric element, thereby discharging ink drops from the nozzles.

The nozzle unit 161 includes a supply port 161B to which the supply pipe extending from the cartridge filter 163 is connected, and ink is introduced into the supply port through the cartridge filter 163 from an ink cartridge (or an ink tank) which is separately provided within the printer 10.

In addition, the nozzle unit 161 is provided with a unit circuit 161C provided with a connector and a control circuit which are connected to the driver substrate 162, and the connector of the unit circuit 161C is connected to the driver substrate 162 by, for example, an FPC or the like.

The driver substrates 162 are stored in the control substrate storage portion 135 of the carriage 13 as described above. The driver substrates 162 are connected to the unit circuits 161C of the corresponding nozzle units 161 as described above. In addition, the driver substrates 162 are connected to the control unit 15 of the printer 10 through the main circuit board 19, and controls the ink discharge mechanisms of the nozzle units 161 on the basis of an instruction signal received from the control unit 15 to thereby discharge ink from the nozzles.

The cartridge filter 163 filters ink supplied from an ink cartridge or an ink tank provided outside the carriage 13 to remove foreign substances as described above, and supplies the filtered ink to the nozzle units 161. The cartridge filter 163 is attachable and detachable to and from the carriage 13, and can perform maintenance such as exchange one a regular basis.

Configuration of Imaging Device 17

Figure 4:
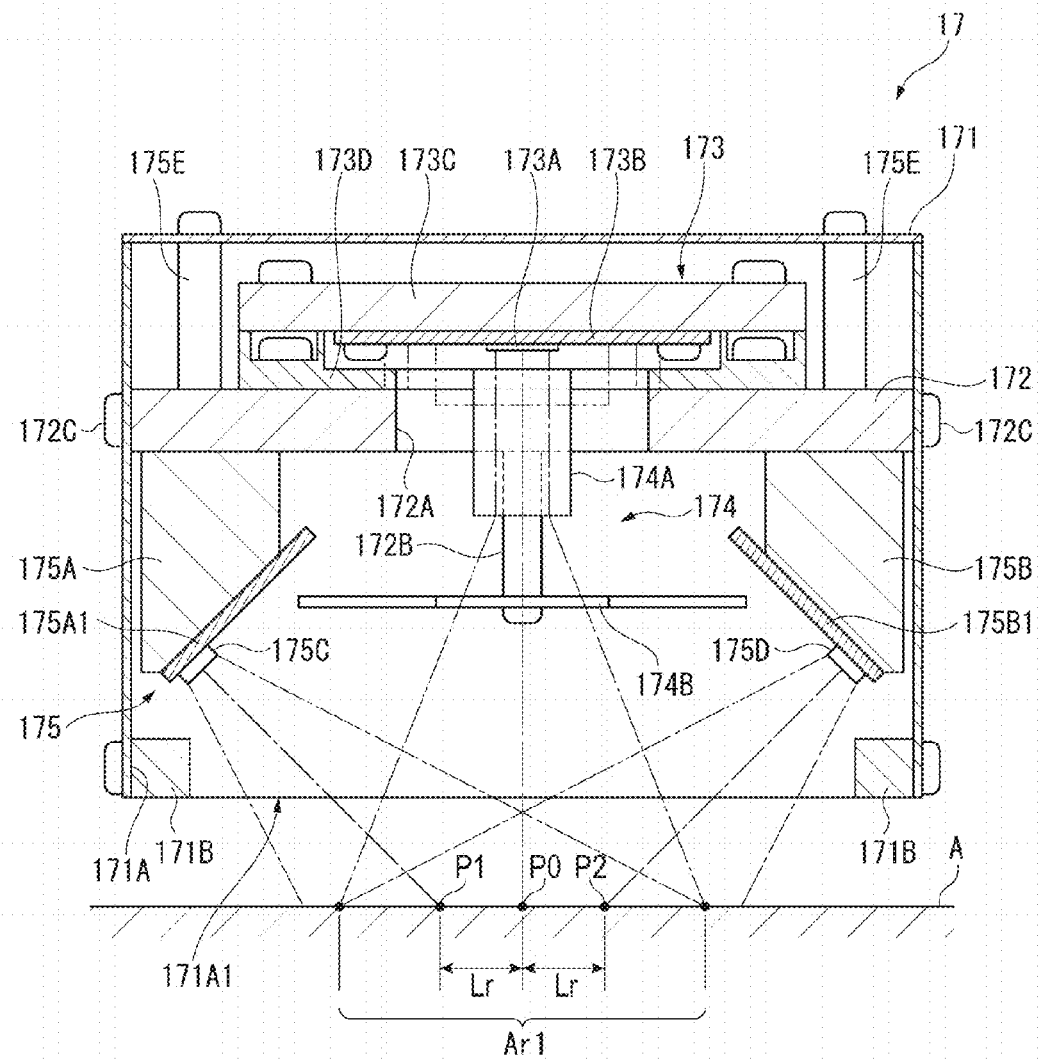
FIG. 4 is a cross-sectional view showing a schematic configuration of an imaging device of this embodiment.

FIG. 4 is a cross-sectional view showing a schematic configuration of the imaging device 17.

The imaging device 17 is provided close to the Full side in the X-direction than to the printing unit 16 and on the +Y side (downstream side) in the Y-direction, as shown in FIG. 3.

The imaging device 17 is configured to include a housing 171, a main plate 172, a sensor unit 173, an imaging optical unit 174, and a light source 175 as shown in FIG. 4.

The housing 171 accommodates the main plate 172, the sensor unit 173, the imaging optical unit 174, and the light source 175 therein. The housing 171 is formed of a material, such as aluminum, which is lightweight and has a high thermal conductivity. The housing 171 is provided with an opening window 171A on the bottom face (surface facing the bottom face 131A) thereof. For example, the opening window 171A is formed to have the same shape as that of the opening 131C provided in the bottom face 131A and is disposed so as to overlap the opening 131C. In addition, a bottom face fixing portion 171B is provided on an inner peripheral surface of the opening window 171A of the housing 171. The bottom face fixing portion 171B is configured such that the bottom face thereof is flush with an opening surface 171A1 in the opening window 171A and is fixed to the bottom face 131A of the carriage 13. Meanwhile, a method of fixing the bottom face fixing portion 171B and the bottom face 131A is not particularly limited, but is preferably configured to be detachable by, for example, screwing.

The main plate 172 is disposed (substantially) in parallel with an XY plane within the housing 171, and is fixed to the housing 171 using a fixing member such as a fixing screw 172C. Meanwhile, the fixing of the main plate 172 is not limited to using the fixing screw 172C, and various fixing methods such as fixing using an adhesive can be used.

In addition, the main plate 172 includes a connector portion (not shown) connected to the main circuit board 19. For example, the connector portion is exposed to the outside of the housing 171 from an opening formed in a portion corresponding to a position at which the main plate 172 of the housing 171 is disposed, and is connected to the main circuit board 19 through a wiring 191.

Furthermore, an opening 172A along an optical axis of the sensor unit 173 (imaging element 173A) is formed in the main plate 172, and a lens unit 174A constituting the imaging optical unit 174 is disposed in the opening 172A. In addition, a filter holding portion 172B extending to the +Z side is provided along the Z-axis direction on the bottom face side (opening window 171A side) of the main plate 172. A flare-cut filter 174B constituting the imaging optical unit 174 is held at the tip end of the filter holding portion 172B.

The sensor unit 173 is fixed to one surface (surface on a side opposite to the opening window 171A) of the main plate 172. The sensor unit 173 is configured to include an imaging element 173A, a sensor board 173B, a first sensor mount 173C, and a second sensor mount 173D.

The imaging element 173A is an RGB image sensor having a plurality of pixels, receives light which is reflected by a predetermined imaging region of the medium A and passes through the opening 131C, the opening window 171A, and the imaging optical unit 174, and outputs an electrical signal based on the amount of light of each color (RGB) which is received from each pixel. In other words, the imaging element 173A includes color filters of respective colors of RGB, and receives light beams having passed through the respective filters to thereby output signals indicating an R grayscale value, a G grayscale value, and B grayscale value with respect to the pixels. In addition, in this embodiment, the imaging element 173A captures an image of an imaging region Ar1 in the medium A. The imaging region Ar1 is, for example, a rectangular region having two sides parallel to each other in the X-direction and two sides parallel to each other in the Y-direction.

In addition, the imaging element 173A is mounted on the sensor board 173B. The sensor board 173B is mounted on the first sensor mount 173C, and the first sensor mount 173C is fixed to the second sensor mount 173D which is mounted on the main plate 172. Thereby, the sensor unit 173 is fixed to the main plate 172 so that an optical axis of the imaging element 173A passes through a center point of the opening 172A of the main plate 172.

An electrical signal which is output from the imaging element 173A is output to the main plate 172 through a circuit provided in the sensor board 173B, a circuit provided in the first sensor mount 173C, and a circuit provided in the second sensor mount 173D, and is output to the main circuit board 19 through the wiring 191 from the main plate 172.

The imaging optical unit 174 includes the lens unit 174A and the flare-cut filter 174B.

The lens unit 174A is a unit that images light reflected by the imaging region of the medium A onto the imaging element 173A, and is constituted by, for example, a combination of a plurality of lenses.

The flare-cut filter 174B is a filter for reducing the influence of irregular reflection of light emitted from the light source 175 in a case where the light is irregularly reflected by the surface of the medium A.

The lens unit 174A and the flare-cut filter 174B are fixed to the main plate 172 as described above. Here, the lens unit 174A and the flare-cut filter 174B are disposed so that the optical axes of the lens unit 174A and the flare-cut filter 174B conform to the optical axis of the imaging element 173A.

The light source 175 is configured to include a first light source mount 175A, a second light source mount 175B, a first light source 175C, and a second light source 175D.

The first light source mount 175A and the second light source mount 175B are provided with the imaging element 173A interposed therebetween along the X-direction when seen from a Z-direction. In other words, the first light source mount 175A is provided at an end on the +X side of the main plate 172 with respect to the X-direction at the center position of the main plate 172 with respect to the Y-direction. In addition, the second light source mount 175B is provided at an end on the −X side of the main plate 172 with respect to the X-direction at the center position of the main plate 172 with respect to the Y-direction. Meanwhile, it is assumed that the imaging element 173A is provided at the center position (centroid position) of the main plate 172.

The first light source mount 175A and the second light source mount 175B are configured such that the base ends (ends on the −Z side) thereof are fixed to the main plate 172 using a fixing member 175E such as a bolt. In addition, the tip ends (ends on the +Z side) of the first light source mount 175A and the second light source mount 175B are respectively provided with inclination fixing portions 175A1 and 175B1 that are inclined so as to face the optical axis of the imaging element 173A and are respectively provided with the first light source 175C and the second light source 175D.

As shown in FIG. 4, an inclination angle of the inclination fixing portion 175A1 is set so that a light irradiation direction of the first light source 175C mounted on the first light source mount 175A is closer to the +X side by a predetermined distance Lr than an intersection point (imaging center P0) between the optical axis of the imaging element 173A and the medium A.

An inclination angle of the inclination fixing portion 175B1 is set so that the light irradiation direction is closer to the −X side by the distance Lr than the imaging center P0.

Meanwhile, in FIG. 4, a description has been given of an example in which the inclination fixing portions 175A1 and 175B1 are set as inclined planes having a distance from the optical axis of the imaging element 173A increasing toward the +Z side, but the invention is not limited thereto. For example, the inclination fixing portions 175A1 and 175B1 may be configured to have a curved surface shape (shape constituting a portion of a conical peripheral surface) which has a distance from the optical axis of the imaging element 173A increasing toward the +Z side. In addition, a description is given of a configuration in which the first light source mount 175A and the second light source mount 175B include the inclination fixing portion 175A1 and the inclination fixing portion 175B1. However, for example, a configuration may be adopted in which the first and second light source mounts include a rotation mechanism capable of changing light irradiation directions of the first and second light sources 175C and 175D, and the light irradiation directions are set to be directed to the imaging center P0.

The first light source 175C and the second light source 175D are constituted by a light source, such as an LED, which is small in size and power consumption. The first light source 175C and the second light source 175D are connected to the main circuit board 19 through circuits provided in the first light source mount 175A and the second light source mount 175B, a circuit provided in the main plate 172, and the wiring 191, and irradiates the imaging region Ar1 with light on the basis of an imaging instruction signal received from the main circuit board 19.

In addition, as described above, the first light source 175C emits light toward the first illumination center P1 closer to the +X side by the distance Lr than the imaging center P0. Accordingly, the medium A is irradiated with light having a light intensity decreasing as a distance from the first illumination center P1 increases, with the first illumination center P1 as a center. On the other hand, the second light source 175D emits light toward a second illumination center P2 which is closer to the −X side by the distance Lr than the imaging center P0. Accordingly, the medium A is irradiated with light having a light intensity decreasing as a distance from the second illumination center P2 increases, with the second illumination center P2 as a center.

Here, the distance Lr is appropriately set so that the imaging region Ar1 is uniformly irradiated with light when the imaging region Ar1 is irradiated with illumination light emitted from the first light source 175C and the second light source 175D. In other words, in this embodiment, the first illumination center P1 is shifted from the imaging center P0 to the +X side by the distance Lr, and the second illumination center P2 is shifted from the imaging center P0 to the −X side by the distance Lr. In addition, light from the first light source 175C is emitted from a side closer to the +X side than the first illumination center P1, and light from the second light source 175D is emitted from a side closer to the −X side than the second illumination center P2. Accordingly, light of the first light source 175C is emitted so as to extend to the −X side with the +X side of the imaging region Ar1 as a center, and light of the second light source 175D is emitted so as to extend to the +X side with the −X side of the imaging region Ar1 as a center. Thereby, the imaging region Ar1 is substantially uniformly irradiated with light, and thus it is possible to suppress brightness unevenness in a captured image due to nonuniformity of the amount of light from a light source.

Meanwhile, in a case where the light sources 175C and 175D are configured to be able to uniformly illuminate a wide range with light, for example, in a case where an integrator optical system constituted by a fly-eye lens or the like is provided, the light sources 175C and 175D may be disposed so that the first illumination center P1 and the second illumination center P2 conform to the imaging center P0.

In addition, in this embodiment, the housing 171 accommodating the light source 175 is formed of a material, such as aluminum, which has a high thermal conductivity, and thus it is possible to release heat generated by the light source 175 to the housing 171 and to suppress deterioration in function due to heat of the imaging element 173A.

Configuration of Spectroscope 18

The spectroscope 18 is provided closer to the +Y side (downstream side) than the printing unit 16 in the Y-direction on a side closer to the Home side than the imaging device 17 in the X-direction.

The spectroscope 18 measures a spectral spectrum at a predetermined position in the medium A. Although not shown in the drawing, the spectroscope 18 includes a light source such as an LED, a spectral unit constituted by an etalon or the like, and a detector that receives light with a predetermined wavelength which is spectrally dispersed by the spectral unit. The spectroscope 18 is electrically connected to the control unit 15 through the main circuit board 19 to perform a spectrometry process in accordance with a spectrometry instruction signal received from the control unit 15.

Configuration of Main Circuit Board 19

The main circuit board 19 is electrically connected to the driver substrates 162 of the printing unit 16, the imaging device 17, the spectroscope 18, and the control unit 15. The main circuit board 19 drives the printing unit 16, the imaging device 17, and the spectroscope 18 on the basis of an instruction signal received from the control unit 15.

For example, in the driving of the imaging device 17, the main circuit board 19 performs driving control of the imaging element 173A and the driving control of the light source 175 on the basis of an imaging instruction signal received from the control unit 15, and captures an image of the imaging region Ar1 of the medium A (imaging process). In addition, the main circuit board 19 includes a circuit, such as an AD converter or an amplifier, which processes an electrical signal which is input from the main plate 172 and is received from the imaging element 173A, and outputs the processed electrical signal to the control unit 15 as an image signal (captured image).

The main circuit board 19 mentioned above is disposed in parallel with, for example, an XY plane so as to intersect the opening surface of the opening window 171A (opening 131C) (so as to be perpendicular to the opening surface in this embodiment), as shown in FIG. 3. Thereby, it is possible to reduce the size of the carriage 13 in the X-direction and the Y-direction, for example, as compared to a case where the main circuit board 19 is disposed in parallel with the XY plane.

That is, the nozzle units 161 that are longitudinal in the Y-direction are disposed in parallel along the X-direction in the printing unit 16 of the carriage 13. In addition, the driver substrates 162 accommodated in the control substrate storage portion 135 are disposed in parallel in the X-direction on the −Z side so as to correspond to the nozzle units 161. With respect to the carriage 13 configured in such a manner, for example, when the main circuit board 19 is disposed such that the board surface thereof is in parallel to the XY plane, the size of the carriage 13 in the direction of the XY plane is increased, and a wasteful space is generated in an upper portion (−Z side) of the main circuit board 19. On the other hand, as described above, the main circuit board 19 is disposed such that the board surface thereof is in parallel to the ZY plane, similar to the nozzle units 161 and the driver substrates 162 of the printing unit 16, and thus it is possible to achieve space saving and to realize a reduction in the size of the carriage 13.

In addition, in this embodiment, details will be described later, and the imaging device 17 and the spectroscope 18 are disposed on the +Y side of the carriage 13 in the Y-direction and the +X side (Full side) in the X-direction. On the other hand, the main circuit board 19 is disposed in parallel with the driver substrates 162 on a side closer to the Full side than the printing unit 16, as shown in FIG. 3. In such a configuration, the main circuit board 19 can be disposed at a position close to all of the driver substrate 162, the imaging device 17, and the spectroscope 18, and thus it is possible to reduce the length of each connection line. In this case, it is possible to achieve the simplification of a configuration and the suppression of signal deterioration due to noise or the like.

Particularly, in this embodiment, a wiring of a parallel communication system is used as the wiring 191 connecting the main circuit board 19 and the imaging device 17 to each other. In such parallel communication, signal lines are parallel to each other, and thus there is a tendency for the lines to be crossed. Here, in a case where a length dimension of the wiring 191 is larger than 200 mm, the influence of the crossed lines is large, and thus it is difficult to obtain a captured image with high brightness. On the other hand, in this embodiment, the length dimension of the wiring 191 is equal to or less than 200 mm. In this case, as described above, it is possible to suppress signal deterioration due to crossing of the signal lines and to acquire a captured image with reduced noise.

Meanwhile, a wiring based on, for example, a low voltage differential signal (LVDS) standard may be used as the wiring 191. In this case, it is possible to reduce the influence of noise or the like even when the length of the wiring is larger than that of the wiring 191 of parallel communication. However, in a case where wiring is performed using an LVDS, additional hardware that processes a differential signal is required, which results in an increase in costs and complication of the apparatus itself.

Arrangement Position of Imaging Device 17 in Carriage 13

As described above, in the carriage 13, the printing unit 16 is disposed on the Home side in the X-direction, and the imaging device 17 is disposed on a side closer to the Full side than the printing unit 16.

In the printer 10, a maintenance box 30 (maintenance unit) that performs the maintenance of the nozzle units 161 is provided in order to prevent ink clogging in the nozzles of the nozzle units 161. The maintenance box 30 is provided on the Home position of the printer 10 as shown in FIG. 1, and discharges ink from the nozzles (flushing) after the carriage 13 is moved to the Home position, during maintenance.

Here, in the carriage 13, in a case where the printing unit 16 is positioned on the Full side, the maintenance box 30 is also required to be shifted to the Full side accordingly, and thus the size of the printer 10 in the X-direction is increased. On the other hand, in this embodiment, since the printing unit 16 is provided on the Home side of the carriage 13, the maintenance box 30 may also be provided at the position of an end on the −X side of the printer 10, and thus it is possible to reduce the size of the printer 10.

In addition, the imaging device 17 is provided on the Full side of the printing unit 16. Therefore, even when the carriage 13 is moved to the Home position, the imaging device 17 does not interfere with the maintenance box 30 even during the movement of the carriage 13. Accordingly, it is possible to suppress ink staining of the imaging device 17, and the like due to the imaging device 17 passing over the maintenance box 30 and to suppress deterioration in the function of the imaging device 17.

Further, the imaging device 17 is provided on a side closer to the +Y side (downstream side) in the Y-direction than the printing unit 16. For this reason, when the test pattern 40 printed by the printing unit 16 is transported to a downstream side, an image of the test pattern 40 can be immediately captured by the imaging device 17. Accordingly, it is possible to rapidly perform a process of calculating a limit value of an ink discharge amount based on the captured image of the test pattern 40.

Meanwhile, it is also considered that the imaging device 17 is disposed on an upstream side of the printing unit 16. In this case, it is necessary to transport the medium A to the upstream side after the test pattern 40 is printed by the printing unit 16.

Configuration of Control Unit 15

The control unit 15 is a control unit in the invention, and is configured to include an I/F 151, a unit control circuit 152, a memory 153, and an arithmetic circuit unit 154 as shown in FIG. 2.

The I/F 151 inputs printing data, which is input from the external device 20, to the arithmetic circuit unit 154.

The unit control circuit 152 includes a control circuit that controls the supply unit 11, the transport unit 12, the carriage 13, and the carriage movement unit 14, and controls the operation of each unit on the basis of an instruction signal received from the arithmetic circuit unit 154.

The memory 153 stores various programs and various pieces of data for controlling the operation of the printer 10.

The arithmetic circuit unit 154 is constituted by an arithmetic circuit such as a central processing unit (CPU), or a storage circuit, and reads out and executes the various programs stored in the memory 153 to thereby function as a scanning control unit 154A, a printing control unit 154B, an imaging control unit 154C, a limit value setting unit 154D, and a condition acquisition unit 154E, as shown in FIG. 2.

The scanning control unit 154A outputs an instruction signal for driving the supply unit 11, the transport unit 12, and the carriage movement unit 14 to the unit control circuit 152. Thereby, the unit control circuit 152 drives the roll driving motor of the supply unit 11 to supply the medium A to the transport unit 12. In addition, the unit control circuit 152 drives the transport motor of the transport unit 12 to transport a predetermined region of the medium A to a position facing the carriage 13 of the platen 122 along the Y-direction. In addition, the unit control circuit 152 drives the carriage motor 142 of the carriage movement unit 14 to move the carriage 13 along the X-direction.

The printing control unit 154B outputs a printing instruction signal for controlling of the driving of the printing unit 16 to the carriage 13 through the unit control circuit 152, for example, on the basis of printing data which is input from the external device 20. The main circuit board 19 of the carriage 13 outputs an instruction indicating the driving of the nozzle units 161 to the corresponding driver substrates 162, on the basis of the printing instruction signal.

Thereby, the driver substrates 162 drive nozzle driving mechanisms (piezoelectric elements and the like) of the nozzle units 161 to discharge ink to the medium A from the nozzles. At this time, the printing control unit 154B reads out limit values for respective colors stored in the memory 153 and discharges ink in a discharge amount that does not exceed the limit values.

Meanwhile, in the printing process of the printing unit 16, a dot forming operation of discharging ink from the printing unit 16 during the movement of the carriage 13 along the X-direction to thereby form dots and a transport operation of transporting the medium A in the Y-direction are alternately repeated, and an image constituted by a plurality of dots is printed on the medium A.

The imaging control unit 154C performs an imaging process of the imaging device 17. Specifically, the imaging control unit 154C outputs an imaging instruction signal for driving the imaging device 17 to the carriage 13 through the unit control circuit 152. The main circuit board 19 of the carriage 13 outputs a driving instruction of the light source 175 and a driving instruction of the imaging element 173A to the imaging device 17 on the basis of the imaging instruction signal, to thereby acquire a captured image of the imaging region Ar1 in the medium A.

The limit value setting unit 154D sets a limit value for controlling an ink discharge amount (ejection amount) on the basis of a captured image of the test pattern which is obtained by the imaging device 17. The calculated limit value is stored in the memory 153, and is used in the next printing process of the printing unit 16, and thus it is possible to expand a color reproduction range as wide as possible and to form a high-quality image in which bleeding due to an excessive ink discharge amount, and the like are suppressed.

The condition acquisition unit 154E acquires, for example, printing conditions that are input from the external device 20 or printing conditions that are set and input by an operation unit (not shown), provided in the printer 10, being operated. The printing conditions are printing quality setting conditions capable of appropriately selected by a user. For example, the printing conditions are levels (high, normal, low, and the like) of color density, and the like, and are equivalent to threshold value change requests of the invention.

In addition, the arithmetic circuit unit 154 also functions as a measurement control unit that performs a spectrometry process on a predetermined measurement position of the medium A using the spectroscope 18, a color measurement unit that calculates chromaticity on a measurement position, and the like and performs color measurement in accordance with a spectrometry result, a calibration unit that updates printing profile data in accordance with a color measurement result, and the like, in addition to having the above-mentioned functions.

Driving Control of Printer 10

Method of Controlling Ink Discharge Amount (Printing Control Method)

Next, a printing control method for controlling an ink discharge amount at the time of forming an image by the printing unit 16 will be described.

FIG. 5 is a flow chart showing a limit value acquisition process in a printing control method.

In the printer 10 of this embodiment, an input operation performed by, for example, a user and a limit value acquisition process of acquiring a limit value of an ink discharge amount is performed at every predetermined period, the limit value is stored in the memory 153, and the ink discharge amount is limited so as not to exceed the limit value in the subsequent printing process.

In the limit value acquisition process, first, the condition acquisition unit 154E acquires printing conditions (step S1). In step S1, printing conditions that are input from the external device 20 or printing conditions that are set and input by an operation unit are acquired. Meanwhile, in a case where there is no printing condition which is input, initial setting (for example, color density "normal") which is set in advance is selected.

Next, the printer 10 reads out, for example, the test pattern 40 stored in the memory 153 and performs a printing process on the medium A (step S2).

Specifically, the printer 10 performs various processes of a supply process, a dot formation process, and a transport process using units by the scanning control unit 154A and the printing control unit 154B. That is, the scanning control unit 154A controls the supply unit 11 and the transport unit 12, supplies a medium A which is a target for printing into the printer 10, and positions the medium A at a printing start position (also referred to as a cueing position) (supply process). Next, the carriage 13 is moved in the X-direction by the scanning control unit 154A, and the printing control unit 154B discharges ink from the printing unit 16 to form dots during the movement of the carriage 13 (dot formation process). The scanning control unit 154A controls the supply unit 11 and the transport unit 12 to transport the medium A to a downstream side along the Y-direction (transport process).

The above-described dot formation process and transport process are repeatedly performed, thereby forming a test chart 4 as shown in FIG. 6.

Here, the test chart 4 used in this embodiment will be described.

FIG. 6 is a diagram showing an example of the test chart 4 in this embodiment.

The test chart 4 of this embodiment is formed by a plurality of test patterns 40 being arranged along the X-direction and the Y-direction. The test patterns 40 are formed with different densities with respect to colors of ink (cyan (C), magenta (M), yellow (Y), black (K)) and basic colors (red (R), green (G), blue (B)) which are formed by changing dot occupancy rates of the ink.

For example, as shown in FIG. 6, the test chart 4 includes an ink color region 4A in which test patterns 40 of respective ink colors are disposed, and a basic color region 4B in which test patterns 40 of respective basic colors are disposed on the right side (−X side) of the ink color region.

In the ink color region 4A, the test patterns 40 of respective colors of CMYK are arranged along the X-direction (toward the −X side from the +X side), and seven test patterns 40 having a density being changed at an interval of 10% from 100% to 40% with respect to each color are arranged along the Y-direction.

The basic color region 4B is divided into a region on the +X side and a region on the −X side. In the region on the +X side, test patterns 40 of colors of RGB are arranged along the X-direction, and seven test patterns 40 having a density being changed at an interval of 10% from 170% to 110% with respect to each color are arranged along the Y-direction. In addition, in the region on the −X side, test patterns 40 of colors of RGB are arranged along the X-direction, and seven test patterns 40 having a density being changed at an interval of 10% from 100% to 40% with respect to each color are arranged along the Y-direction.

Each of the test patterns 40 is formed, for example, in a rectangular shape having two sides parallel to each other in the X-direction and two sides parallel to each other in the Y-direction.

Meanwhile, the term "density" as used herein is an occupancy rate of ink drops (dots) per unit area. For example, the density of cyan (C) being 100% indicates a state where dots of cyan (C) are ejected at a rate of 100% per unit area (ink drops are discharged), and the density of cyan (C) being 80% indicates a state where dots of cyan (C) are ejected at a rate of 80% per unit area. In addition, a basic color can be expressed by a plurality of pieces of ink are ejected into the same region. For example, red (R) is formed by magenta (M) and yellow (Y) being ejected into the same region. The density of red (R) being 170% means that dots of magenta (M) are ejected at a rate of 85% per unit area, and dots of yellow (Y) are ejected at a rate of 85% per unit area.

In addition, the example shown in FIG. 6 is just an example. For example, an example in which the basic color region 4B is divided into a region on the +X side and a region on the −X side has been described, but a configuration may be adopted in which 14 test patterns 40 are arranged at an interval of 10% from 170% to 40% along the Y-direction. In addition, an interval of density is not limited to 10%, and may be an interval of 5%, or the like. An upper limit of the density of a basic color is set to 170%, but may be set to 200%. A lower limit of the density of each color may be set to 10% or the like.

Incidentally, in a case where ink drops are discharged onto a medium A to form an image, a large discharge amount causes unevenness in the image.

Figure 7A:
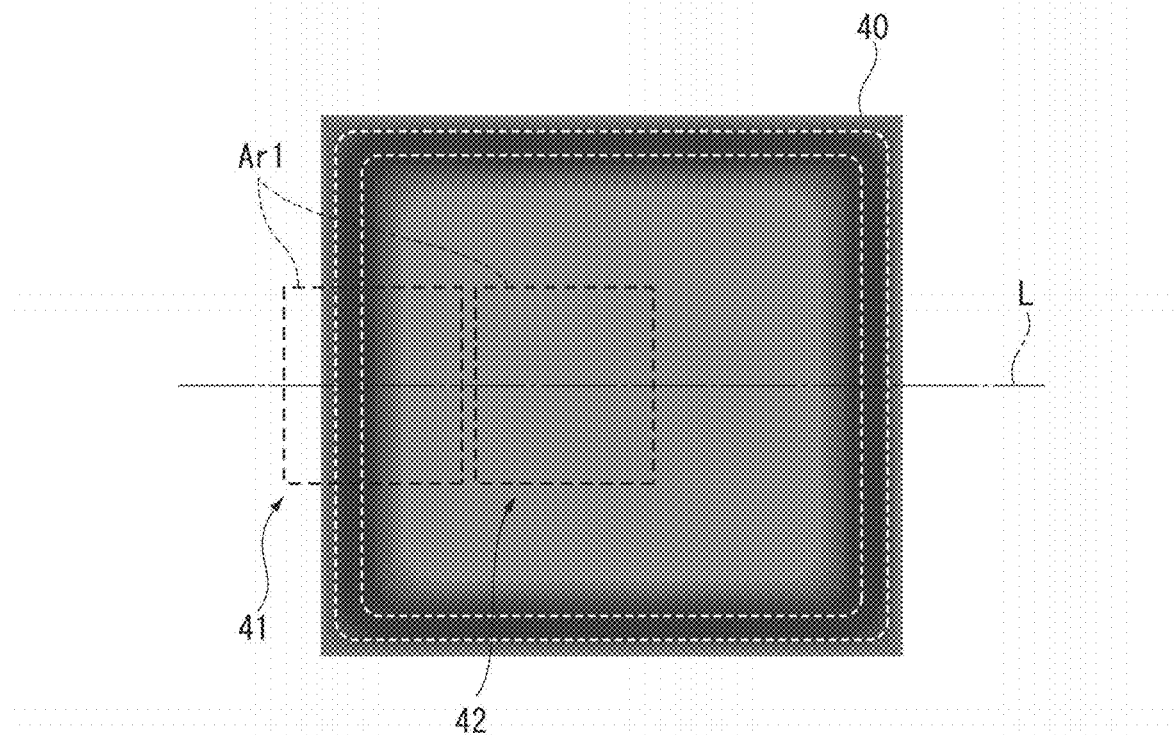
FIG. 7A is an enlarged view of a test pattern.
Figure 7B:
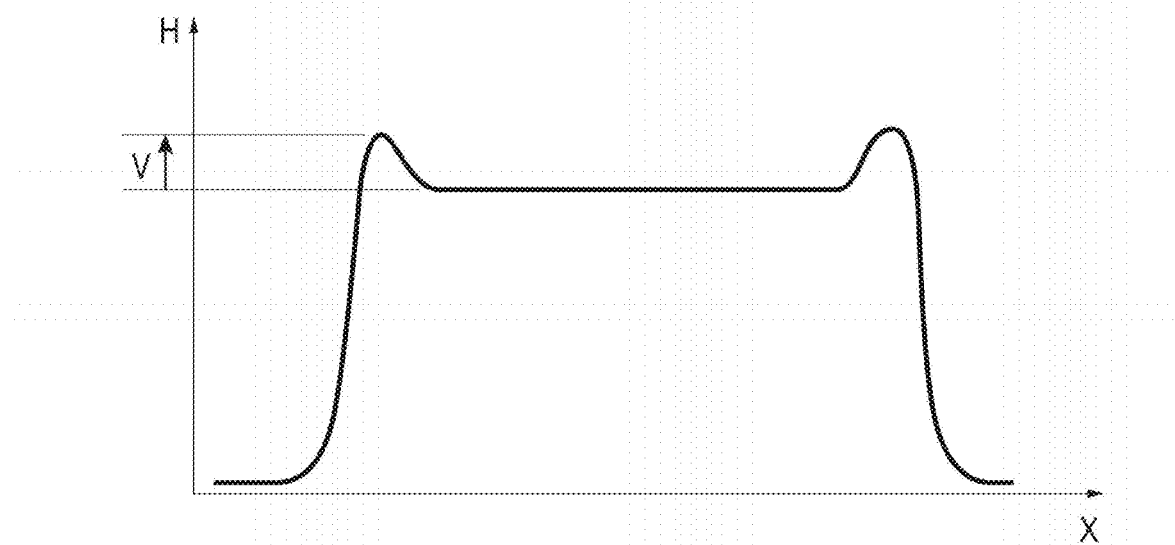
FIG. 7B is a diagram showing changes in a linear sum along an X-direction.

FIG. 7A is a diagram showing an example of the test pattern 40 in a case where a discharge amount of ink drops is excessively large, and FIG. 7B is a diagram showing changes in a linear sum H along a virtual line L in a captured image of the test pattern 40 of FIG. 7A.

In other words, a large ink discharge amount causes a phenomenon in which a line, such as a stain, which has a higher density than that of a central portion of the image is formed in the outer peripheral edge of the test pattern 40, as shown in FIG. 7A.

In this embodiment, a grayscale value of the captured image of the test pattern 40 is read focusing on such a phenomenon, and a limit value is set on the basis of the grayscale value. Hereinafter, details thereof will be described.

Referring back to FIG. 5, when the test pattern 40 is formed by the printing unit 16 in step S2, the imaging control unit 154C captures an image of the test pattern 40 to thereby acquire the captured image (step S3).

In step S3, the scanning control unit 154A controls the transport unit 12 so that an imaging center of the imaging region Ar1 of the imaging device 17 conforms to the center of the test pattern 40, to thereby transport a medium A in the Y-direction. Thereafter, the scanning control unit 154A moves the carriage 13 in the X-direction and moves the imaging region Ar1 toward, for example, the Home side from the Full side. The imaging control unit 154C controls the imaging device 17 during the movement of the carriage 13 to sequentially capture images of the test patterns 40. Meanwhile, the movement of the carriage 13 may be stopped at an imaging timing of the imaging device 17.

Here, in this embodiment, the longitudinal and lateral sizes of the imaging region Ar1 are smaller than the longitudinal and lateral sizes (length in the X-direction and length in the Y-direction) of the test pattern 40. Therefore, as described above, when the medium A is transported and the carriage 13 is moved along the X-direction so that the imaging center of the imaging region Ar1 and the center of the test pattern 40 lie on the same line (virtual line L), the imaging region Ar1 passes through the inside of the test pattern 40 from the outside of the test pattern 40 and is moved to the −X side, as shown in FIG. 7A.

The imaging control unit 154C acquires a captured image when one end side (for example, a side on the +X side) of the test pattern 40 is included in the imaging region Ar1 and when all regions of the imaging region Ar1 are included in the test pattern 40. In other words, the imaging control unit 154C makes the imaging device 17 capture an image of a first region 41 including one end side on the +X side (may be a side on the −X side) in the test pattern 40 and an image of a second region 42 inside the test pattern 40. In this embodiment, since the test pattern 40 is printed by the printing unit 16 on the basis of image data for test pattern which is stored in advance, the positions of the respective test patterns 40 are already known. In addition, the imaging device 17 is mounted on the carriage 13 which is the same as that of the printing unit 16, and a positional relationship between the printing unit 16 and the imaging device 17 is already known, thereby allowing an image of a predetermined position (the first region 41 and the second region 42) on the test pattern 40 to be captured with a high level of accuracy. Meanwhile, the first region 41 and the second region 42 may partially overlap each other.

Meanwhile, in the above-mentioned example, a description has been given of an example in which captured images of the first region 41 and the second region 42 are acquired during the movement of the carriage 13, but the invention is not limited thereto. For example, in a case where the size of the imaging region Ar1 is larger than the size of the test pattern 40, the first region 41 and the second region 42 in the test pattern 40 may be cut out after images of the test patterns 40 are captured.

In this embodiment, in step S2, after the printing of the test pattern 40 using the printing unit 16 is terminated, a medium is transported to the −Y side, the alignment of the imaging region Ar1 and the test pattern 40 is performed by the imaging device 17. On the other hand, since the test patterns 40 printed by the printing unit 16 are sequentially transported to the +Y side, images of the test patterns 40 transported by the imaging device 17 may be sequentially captured. That is, the printing process in step S2 and the imaging process in step S4 may be alternately performed. In this case, captured images are sequentially acquired from the test pattern 40 on the +Y side in the test chart 4.

After step S3 mentioned above is performed, the limit value setting unit 154D reads RGB grayscale values of pixels of the captured image (first image) of the first region 41 and the captured image (second image) of the second region 42, to thereby calculate a linear sum H(x, y) of each pixel (step S4).

Specifically, the limit value setting unit 154D sets an image size of a captured image to be $x_n \times y_m$ ($x_1 \le x \le x_n$, $y_1 \le y \le y_m$), sets a variable (color variable) indicating RGB to be i (i=R, G, B), sets a grayscale value for a color variable i in a pixel (x, y) to be $D_i(x, y)$, sets a grayscale value in a captured image in a dark state (state where light is not incident on the imaging element 173A) to be $D_{i\_dark}(x, y)$, and sets a grayscale value in a captured image of a white reference (for example, a region in which a test pattern 40 of paper is not printed) to be $D_{i\_ref}(x, y)$, thereby calculating an optical density $A_i(x, y)$ for each color (color variable) in each pixel by the following Expression (2).

$$A_i(x, y) = -\log_{10}\left( \frac{D_i(x, y) - D_{i\_dark}(x, y)}{D_{i\_ref}(x, y) - D_{i\_dark}(x, y)} \right) \quad (2)$$

Meanwhile, here, an example in which $D_{i\_dark}(x, y)$ for each pixel (x, y) is used is described, but a common value $D_{i\_dark}$ may be used with respect to all pixels. The same is true of $D_{i\_ref}(x, y)$, and a common value $D_{i\_ref}$ may be used for all pixels.

Next, the limit value setting unit 154D calculates a linear sum H(x, y) of each pixel (x, y) by the following Expression (3) using a coefficient $a_i$ for a color variable i which is set in advance in accordance with an ink color (combination of pieces of ink used) which is used for the test pattern 40. Meanwhile, Expression (3) mentioned above is the same as Expression (1) mentioned above. The linear sum H becomes larger in a pixel in which a grayscale value of each color is large. Therefore, as shown in FIG. 7B, in a case where an ink discharge amount is large and a line with high density is generated in the outer peripheral edge of the test pattern 40, a linear sum for a region in the vicinity of the outer peripheral edge becomes larger than, for example, that for the central region of the test pattern 40.

$$H(x, y) = \sum_{i=R,G,B} a_i A_i(x, y) \quad (3)$$

The limit value setting unit 154D calculates an evaluation index V using the linear sum H(x, y) calculated with respect to each pixel (x, y) of the captured image of the first region 41 and the captured image of the second region 42 (step S5).

Specifically, the limit value setting unit 154D detects a maximum value (maximum linear sum) $maxH_1$ among linear sums H(x, y) calculated with respect to the captured image of the first region 41. In addition, the limit value setting unit 154D calculates an average linear sum $avrH_2$ of linear sums H(x, y) calculated with respect to the captured image of the second region 42. The limit value setting unit 154D calculates an evaluation index V on the basis of the following Expression (4).

$$V = maxH_1 - avrH_2 \quad (4)$$

Next, the limit value setting unit 154D determines a limit value on the basis of correlation data indicating a relationship between an evaluation index stored in the memory 153 in advance and an ink discharge amount (step S6).

FIG. 8 is a diagram showing an example of correlation data indicating a relationship between an ink discharge amount (ejection amount) and an evaluation index V.

In FIG. 8, $V_{th0}$, $V_{th1}$, and $V_{th2}$ indicate a threshold value, and correspond to printing conditions acquired in step S1. The limit value setting unit 154D selects the threshold value $V_{th0}$, for example, in a case where color density of "normal" is set as a printing condition, selects the threshold value $V_{th1}$ in a case where color density of "high" is set as a printing condition, and selects the threshold value $V_{th2}$ in a case where color density of "low" is set as a printing condition. Meanwhile, here, a description is given of an example in which three color densities can be selected by a user, and three threshold values corresponding to the color densities are provided to be selectable. However, more color densities may be selected by a user, and more threshold values corresponding to the color densities may be selected. Furthermore, an example in which a threshold value corresponding to a user's desired color density can be selected has been described, but a configuration may be adopted in which a threshold value is set to any value by a user's setting input.

The limit value setting unit 154D determines an ink ejection amount (discharge amount) corresponding to the selected threshold value $V_{th}$, as a limit value. For example, in a case where the threshold value $V_{th0}$ is selected, an ink discharge amount of 80% is determined as a limit value. The limit value is determined with respect to each of ink colors (CMYK) and each of basic colors (RGB), and the determined limit value is appropriately stored in the memory 153 and is used during the next printing process of the printing unit 16. In other words, when the printing process of the printing unit 16 is performed, the printing control unit 154B performs control of discharging ink from the nozzle units 161 so that a color reproduction range is not narrowed and a limit value is not exceeded. Thereby, it is possible to form a high-quality image on the medium A.

Operational Effects of this Embodiment

The printer 10 of this embodiment includes the imaging device 17 that captures an image of a medium A, and the control unit 15. The control unit 15 acquires a captured image of the test pattern 40 which is captured by the imaging device 17, to thereby control an ink discharge amount on the basis of a grayscale value of the first region 41 including the outer peripheral edge of the test pattern 40 and a grayscale value of the second region 42 within the test pattern 40.

In other words, an ink discharge amount in the printing unit 16 is controlled so that a difference in density between the first region 41 and the second region 42 is eliminated. In this embodiment configured in such a manner, an optimal ink discharge amount can be set regardless of the type of medium A. That is, in a printing apparatus of the related art, a limit value of an ink discharge amount is measured in advance in accordance with the type (for example, plain paper, glossy paper, or the like) of medium which is set in advance and is stored in a memory. In this case, a high-quality image can be formed on the set medium in accordance with an appropriate ink discharge amount, but a user's intended image may not be formed on a medium which is not stored in the memory due to a different ink permeation method and the like. On the other hand, in this embodiment, the test pattern 40 is formed on the medium A, and an ink discharge amount is controlled on the basis of a captured image thereof. Accordingly, for example, even when an image is desired to be printed on a medium A which is not known, the above-mentioned limit value acquisition process is performed, and thus it is possible to perform a highly-accurate printing process on the medium A without excessively narrowing a color reproduction range and while suppressing deterioration in image quality due to bleeding or the like.

In this embodiment, the limit value setting unit 154D sets a limit value of an ink discharge amount. Such a limit value is set and is stored in the memory 153, and thus it is possible to easily control an ink discharge amount by reading out the limit value stored in the memory 153 at the time of subsequently performing printing under the same printing conditions.

In this embodiment, the limit value setting unit 154D calculates an evaluation index V for evaluating a difference in density between the first region 41 and the second region 42 of the test pattern 40 on the basis of grayscale values of pixels in the first region 41 and grayscale values of pixels in the second region 42, to thereby determine a limit value. The limit value is obtained on the basis of the evaluation index V, and thus it is possible to accurately obtain a limit value a droplet discharge amount allowing high-quality printing to be performed, regardless of the type of medium and operation conditions.

In this embodiment, a difference value between a maximum linear sum $maxH_1$ which is a maximum value of a linear sum $H(x, y)$ with respect the first region 41 and an average linear sum $avrH_2$ of a linear sum $H(x, y)$ of each pixel with respect to the second region 42 is calculated as an evaluation index V.

In this case, it is possible to easily and accurately detect whether a high density portion based on an ink discharge amount is present or not in the outer peripheral portion of the test pattern 40, on the basis of an evaluation index V based on a difference between a density in the vicinity of the peripheral portion of the test pattern 40 and a density in the central region of the test pattern 40.

In this embodiment, the limit value setting unit 154D sets a limit value in which an evaluation index V is set to be equal to or less than a threshold value $V_{th}$. In other words, an ink discharge amount equal to or less than the threshold value $V_{th}$ is determined as a limit value on the basis of correlation data between an ink discharge amount and the evaluation index V. Thereby, it is possible to suppress deterioration in quality due to bleeding or the like, to set a limit value capable of expand a color reproduction range as wide as possible, and to perform high-quality printing.

In addition, in this embodiment, the condition acquisition unit 154E acquires printing conditions which are input from the external device 20 or an operation unit, and the limit value setting unit 154D selects a threshold value $V_{th}$ corresponding to the acquired printing conditions and acquires a limit value which is equal to or less than the threshold value $V_{th}$.

In this case, it is possible to make a change to a threshold value according to a user's preference and to perform a printing process having a user's desired quality.

In this embodiment, the carriage 13 which is movable in the X-direction is provided and is mounted with the imaging device 17 and the printing unit 16.

For this reason, a printing process of the printing unit 16 and an imaging process of the imaging device 17 can be performed using the same coordinate system. Thereby, it is possible to accurately associate the test pattern 40 captured by the printing unit 16 and a captured image obtained by the imaging process with each other and to perform a correction arithmetic process with a high level of accuracy.

In addition, it is possible to easily acquire captured images of the first region 41 and the second region 42 of the test pattern 40 by only moving the carriage 13 in the X-direction.

Second Embodiment

Next, a second embodiment according to the invention will be described.

In the above-described first embodiment, the evaluation index V is set as a difference between the maximum linear sum $maxH_1$ in the captured image of the first region 41 and the average linear sum $avrH_2$ in the captured image of the captured image of the second region 42. On the other hand, in the second embodiment, a method of calculating an evaluation index V is different from that in the above-described first embodiment.

The second embodiment has the same configuration as that of the first embodiment, and thus a description of each component will not be repeated. In a limit value acquisition process in a printer 10 of the second embodiment, the processes of steps S1 to S4 of FIG. 5 are the same as those in the above-described first embodiment.

In the printer 10 of this embodiment, a limit value setting unit 154D further calculates a standard deviation σ of a linear sum $H(x, y)$ of each pixel $(x, y)$ of a captured image of a second region 42 in addition to calculating a maximum linear sum $maxH_1$ in a captured image of a first region 41 and an average linear sum $avrH_2$ in the captured image of the second region 42, in the process of step S5 of FIG. 5.

Thereafter, the limit value setting unit 154D calculates an evaluation index $V_2$ on the basis of the following Expression (5).

$$V_2 = \frac{maxH_1 - avrH_2}{\sigma} \tag{5}$$

That is, the evaluation index $V_2$ in this embodiment is obtained by dividing the evaluation index V in the first embodiment by the standard deviation σ.

The subsequent processes are the same as those in the first embodiment. Correlation data between an ink ejection amount and the evaluation index $V_2$ is stored in a memory 153 in advance, and an optimal ink ejection amount (discharge amount) which is equal to or less than a threshold value based on printing conditions is set as a limit value.

In this embodiment, it is possible to remove the influence of noise and the influence of a density fluctuation in the central region of a test pattern by using the evaluation index $V_2$ obtained by Expression (5) using a standard deviation σ of a linear sum H(x, y) of each pixel (x, y) of a captured image of the second region 42. Therefore, it is possible to improve the accuracy of the evaluation index $V_2$ and to print a high-quality image of which the image quality is not deteriorated due to bleeding or the like, while more reliably expanding a color reproduction range as wide as possible by setting a limit value of an ink discharge amount on the basis of the evaluation index $V_2$.

Third Embodiment

Next, a third embodiment according to the invention will be described.

In the above-described first embodiment, a linear sum H(x, y) of each pixel of a captured image of the first region 41 and a captured image of the second region 42 are calculated. On the other hand, the third embodiment is different from the above-described first embodiment in that a linear sum is calculated using a pixel average value obtained by averaging grayscale values of images arranged in the Y-direction.

The third embodiment has the same configuration as that of the first embodiment, and thus a description of each component will not be repeated. In the limit value acquisition process in the printer 10 of the second embodiment, the processes of steps S1 to S3 of FIG. 5 are the same as those in the above-described first embodiment.

In a printer 10 of this embodiment, first, a limit value setting unit 154D reads RGB grayscale values of pixels of a captured image of a first region 41 and a captured image of a second region 42, to thereby calculate a pixel average value obtained by averaging grayscale values of pixels arranged in the Y-direction, in the process of step S4 of FIG. 5. In other words, the limit value setting unit 154D calculates a pixel average value $E_i(x)$ by the following Expression (6). Thereby, the pixel average value $E_i(x)$ is calculated with respect to each of x coordinate values $(x_1 \leq x \leq x_m)$ in the captured images.

$$E_i(x) = \frac{\sum_{y=y_1}^{y_x} G_i(x, y)}{m} \qquad (6)$$

Thereafter, the limit value setting unit 154D substitutes a grayscale value $D_i(x, y)$ in Expression (2) for a pixel average value $E_i(x)$, to thereby calculate an average optical density $A_i(x)$ of the x coordinate values. Similarly, $A_i(x, y)$ in Expression (3) is substituted for $A_i(x)$, to thereby calculate a linear sum H (x) with respect to each x coordinate value.

The subsequent processes are the same as those in the above-described embodiment. A maximum linear sum $maxH_1$ in a captured image of the first region 41 is detected, and an average linear sum $avrH_2$ in a captured image of the second region 42 is calculated, and an evaluation index V is calculated on the basis of Expression (4) (or an evaluation index $V_2$ is calculated on the basis of Expression (5)).

As described above, each test pattern 40 has a rectangular shape having sides along the X-direction and the Y-direction, and an imaging region Ar1 also has a rectangular shape having sides along the X-direction and the Y-direction. In addition, the imaging region Ar1 is smaller than the test pattern 40, and moves a carriage 13 in the X-direction so that the center of the imaging region Ar1 passes through the center of the test pattern 40, thereby acquiring a captured image.

In this case, grayscale values of pixels arranged in the Y-direction are substantially constant in each captured image, and it is possible to more accurately determine changes in grayscale value along the X-direction by using a pixel average value obtained by averaging grayscale values of pixels arranged in the Y-direction. In addition, it is possible to achieve the simplification of an arithmetic process, as compared to a case where a linear sum is calculated with respect to all pixels of a captured image.

Modification Example

Meanwhile, the invention is not limited to the above-described embodiment, and includes modifications, corrections, and the like in a range in which an object of the invention can be accomplished.

For example, in the above-described embodiment, a description has been given in which the imaging device 17 is mounted on the carriage 13 together with the printing unit 16, but the invention is not limited thereto.

In other words, a printer may include a carriage for imaging having the imaging device 17 mounted thereon, apart from a carriage for printing which is provided with the printing unit 16, and the carriage for imaging may be configured to be movable by a movement mechanism having the same configuration as that of the carriage movement unit 14 in the above-described embodiment. In such a configuration, a first direction movement unit for moving the carriage for printing relatively to a medium in the X-direction and a second direction movement unit for moving the carriage for printing relatively to a medium in the Y-direction are additionally provided.

In the above-described embodiment, a description has been given of an example in which a limit value is set by the control unit 15 on the basis of a captured image acquired by the imaging device 17, but the invention is not limited thereto. For example, a captured image may be transmitted to the external device 20 (for example, a personal computer or the like), and a limit value may be set by the external device 20.

A description has been given of an example in which an evaluation index V is calculated on the basis of Expression (4) in the first embodiment, and an evaluation index $V_2$ is calculated on the basis of Expression (5) in the second embodiment. However, the invention is not limited to the evaluation indexes, and an evaluation index may be calculated by another method. For example, an average linear sum $avrH_1$ of a linear sum H(x, y) of each pixel of a captured image of the first region 41 may be calculated, and an evaluation index $V_3$ may be calculated by Expression (7). In addition, an evaluation index $V_4$ as shown in Expression (8) may be calculated by calculating a minimum value $minH_2$ of a linear sum H(x, y) of each pixel of a captured image of the second region 42, and an evaluation index $V_5$ as shown in Expression (9) may be calculated by calculating a maximum linear sum $maxH_2$ in a captured image of the second region 42.

$$V_3 = avrH_1 - avrH_2 \qquad (7)$$

$$V_4 = maxH_1 - minH_2 \qquad (8)$$

$$V_5 = maxH_1 - maxH_2 \qquad (9)$$

In the above-described embodiment, a description has been given of an example in which captured images of the first region 41 and the second region 42 which are arranged along the X-direction are acquired by moving the carriage 13 in the X-direction, but the invention is not limited thereto.

For example, captured images of the first region and the second region which are arranged along the Y-direction may be acquired by fixing the carriage 13 and transporting a medium A in the Y-direction. That is, captured image of the first region including an end side of the test pattern 40 on the +Y side (or the −Y side) and a captured image of the second region within the test pattern 40 may be acquired.

In the above-described embodiments, a description has been given of an example in which a limit value is set by calculating an evaluation index on the basis of a grayscale value of a captured image, but the invention is not limited thereto. For example, an ink discharge amount may be controlled on the basis of a grayscale value of a predetermined color in a captured image of the first region and a grayscale value of a predetermined color in a captured image of the second region 42. For example, with respect to an R component, an optical density determination value $B_R(x, y)$ of the R component for each pixel (x, y) is calculated using the following Expression (10) instead of Expression (3) mentioned above.

$$B_R(x,y) = a_R A_R(x,y) \tag{10}$$

Thereafter, an ink discharge amount of R(=M+Y) may be controlled so that a value obtained by subtracting an average value ($avrB_{2R}$) of an R optical density determination value $B_R(x, y)$ in the captured image of the second region 42 from a maximum value ($maxB_{1R}$) of an R optical density determination value $B_R(x, y)$ in the captured image of the first region 41 is set to be equal to or less than a predetermined threshold value, instead of using, for example, $maxH_1$ and $avrH_2$ in Expression (4).

Further, a pixel determination value $C_i(x, y)$ for each color (RGB) of each pixel (x, y) may be calculated using the following Expression (11), instead of using Expression (2).

$$C_i(x, y) = 1 - \frac{D_i(x, y) - D_{dark,i}(x, y)}{D_{ref,i}(x, y) - D_{dark,i}(x, y)} \tag{11}$$

In this case, a pixel determination value $C_i(x, y)$ may be used during the calculation of a linear sum $H(x, y)$ based on Expression (3), instead of using an optical density $A_i(x, y)$, and the subsequent processes are the same as those in the above-described embodiments.

In the above-described embodiments, an RGB image sensor is illustrative of an imaging device, but the invention is not limited thereto. For example, a spectroscopic camera, a monochromatic camera, or the like may be used as an imaging device. In the RGB image sensor, a linear sum $H(x, y)$ is calculated using color variables i corresponding to three colors of RGB. However, in a case where a spectroscopic camera is used, it is possible to calculate a linear sum and an evaluation index with a higher level of accuracy on the basis of the amount of received light with more wavelengths.

In the capture of a spectral image using a spectroscopic camera, for example, a configuration may also be adopted in which an image sensor is mounted to the spectroscope 18, and light spectrally dispersed by the spectroscope 18 is acquired by the image sensor.

The position of the imaging device 17 with respect to the printing unit 16 in the carriage 13 is not limited to the Full side of the printing unit 16. For example, the imaging device may be disposed on the Home side of the printing unit 16. In this case, when the imaging device 17 is disposed on a side closer to the +Y side in the Y-direction than the printing unit 16, and the size of the maintenance box 30 in the Y-direction is reduced, it is possible to suppress ink staining when the imaging device 17 passes over the maintenance box 30.

In addition, when the carriage 13 moves to the Home position, the maintenance box 30 may be positioned at a location facing the imaging device 17. For example, it is possible to suppress ink staining of the imaging device 17 by adopting a configuration in which a lid member is provided in the opening window 171A of the imaging device 17 and is opened at the time of performing an imaging process by the imaging device 17.

A description has been given of an example in which the imaging device 17 is provided on a side closer to the +Y side than the printing unit 16 in the carriage 13, but the imaging device 17 may not be provided on the −Y side of the printing unit 16. That is, for example, the imaging device 17 may be provided on the −Y side of the printing unit 16 by adopting a configuration in which a plurality of transport rollers are disposed on the front and rear sides (+Y side and −Y side) of the platen 122, and the amount of transport of a medium A in the −Y-direction can be controlled with a high level of accuracy.

In addition, the printing unit 16 and the imaging device 17 may be provided at the same position in the Y-direction.

The carriage 13 is moved relatively to the medium A in the Y-direction by transporting the medium A in the Y-direction by the supply unit 11 and the transport unit 12, but the invention is not limited thereto.

For example, the carriage 13 may be configured to be movable in the Y-direction. In addition, the carriage 13 may be configured to be movable along both the X and Y directions.

Furthermore, the carriage movement unit 14 moves the carriage 13 in the X-direction, but may be configured to move the medium A in the X-direction.

In the above-described embodiment, a description has been given of a configuration in which the imaging device 17 includes the light source 175. However, for example, a configuration may also be adopted in which a light source is provided separately from the imaging device 17. Also in this case, it is preferable that the light source be provided within the carriage 13. In addition, a configuration may also be adopted in which the test pattern 40 is irradiated with external light taken thereinto without providing a light source.

In addition, a configuration in which the light source 175 is provided with the first light source 175C and the second light source 175D has been described. However, for example, in a case where an optical system, such as an integrator illumination optical system, which makes illumination light uniform is incorporated, or a light source capable of irradiating the imaging region Ar1 with uniform light is used, only one light source may be provided. Furthermore, three or more light sources may be used. In a case where three light sources are used, a configuration may also be adopted in which the light sources are rotationally symmetrically disposed when seen from the Z-direction. In addition, in a case where four light sources are used, a configuration may be adopted in which two light sources are disposed along the Y-direction and two light sources are disposed along the X-direction.

Furthermore, in the above-described embodiment, a description has been given of an example in which the first light source 175C and the second light source 175D are provided along the X-direction, but the invention is not limited thereto. For example, a configuration may also be adopted in which the first light source 175C and the second light source 175D are provided along the Y-direction and uniformly emits illumination light along the Y-direction.

A configuration in which the imaging device 17 includes the housing 171 has been described. However, for example, a configuration may also be adopted in which the sensor unit 173 and the light source 175 which constitute the imaging device 17 are directly provided on the base 131 of the carriage 13.

In addition, a specific structure at the time of implanting the invention can be appropriately changed to another structure or the like in a range in which an object of the invention can be accomplished.

The entire disclosure of Japanese Patent Application No. 2015-185963, filed Sep. 18, 2015 is expressly incorporated by reference herein.

What is claimed is:

1. A printing apparatus comprising:
an imaging device that captures an image of an object; and
a control unit that controls a discharge amount of droplets of a printing unit that discharges the droplets to form an image,
wherein the control unit acquires a captured image of a test pattern formed by the printing unit from the imaging device and controls the discharge amount of the droplets on the basis of a grayscale value of a first region including an outer peripheral edge of the test pattern in the captured image and a grayscale value of a second region within the test pattern;
wherein the control unit sets a limit value of the discharge amount of the droplets;
wherein the control unit calculates an evaluation index for evaluating a difference in density between the first region and the second region on the basis of grayscale values of pixels in the first region and grayscale values of pixels in the second region, to thereby set the limit value on the basis of the evaluation index.

2. The printing apparatus according to claim 1,
wherein the imaging device captures an image of light through a plurality of color filters by an imaging element to thereby acquire grayscale values of a plurality of respective colors included in the plurality of color filters,
wherein the control unit sets a color variable indicating one color among the plurality of colors to be i to calculate an optical density $A_i$ of each pixel with respect to the color variable i on the basis of the grayscale values of the pixels of the first region and the second region with respect to the color variable i, and sets a coefficient with respect to the color variable i to be $a_i$ to calculate a linear sum H of each pixel by Expression (1) mentioned below, and $$H = \sum_i a_i A_i \quad (1)$$

wherein the evaluation index V is calculated as V=$maxH_1$-$avrH_2$ when a maximum value in the linear sum of each pixel with respect to the first region is set to be $maxH_1$, and an average value in the linear sum of each pixel with respect to the second region is set to be $avrH_2$.

3. The printing apparatus according to claim 1,
wherein the imaging device captures an image of light through a plurality of color filters by an imaging element to thereby acquire grayscale values of a plurality of respective colors included in the plurality of color filters,
wherein the control unit sets a color variable indicating one color among the plurality of colors to be i to calculate an optical density $A_i$ of each pixel with respect to the color variable i on the basis of the grayscale values of the pixels of the first region and the second region with respect to the color variable i, and sets a coefficient with respect to the color variable i to be $a_i$ to calculate a linear sum H of each pixel by Expression (1) mentioned below, and $$H = \sum_i a_i A_i \quad (1)$$

wherein the evaluation index V is calculated as V=($maxH_i$−$avrH_2$)/σ when a maximum value in the linear sum H of each pixel with respect to the first region is set to be $maxH_1$, an average value in the linear sum H of each pixel with respect to the second region is set to be $avrH_2$, and a standard deviation of the linear sum H of each pixel in the second region is set to be σ.

4. The printing apparatus according to claim 1,
wherein the control unit sets the limit value so that the evaluation index is set to be equal to or less than a threshold value.

5. The printing apparatus according to claim 4,
wherein when the control unit receives a threshold value change request for changing the threshold value, the control unit changes the threshold value on the basis of the threshold value change request.

6. The printing apparatus according to claim 1, further comprising:
a movement mechanism that moves the imaging device relatively to the object in one direction.

7. The printing apparatus according to claim 6,
wherein the control unit calculates a pixel average value obtained by averaging the grayscale values of pixels in a direction intersecting the one direction in the captured image, to thereby control a discharge amount of the droplets on the basis of the pixel average value along the one direction.

8. The printing apparatus according to claim 6, further comprising:
a carriage that has the imaging device and the printing unit mounted thereon,
wherein the movement mechanism moves the carriage relatively to the object along the one direction.

9. A printing control method comprising:
acquiring a captured image of a test pattern formed by discharging droplets by a printing unit;
controlling a discharge amount of the droplets in the printing unit on the basis of a grayscale value of a first region including an outer peripheral edge of the test pattern in the captured image and a grayscale value of a second region within the test pattern;
setting a limit value of the discharge amount of the droplets; and
calculating an evaluation index for evaluating a difference in density between the first region and the second region on the basis of grayscale values of pixels in the first region and grayscale values of pixels in the second region, to thereby set the limit value on the basis of the evaluation index.

\* \* \* \* \*